United States Patent
An et al.

(10) Patent No.: US 11,087,086 B2
(45) Date of Patent: Aug. 10, 2021

(54) NAMED-ENTITY RECOGNITION THROUGH SEQUENCE OF CLASSIFICATION USING A DEEP LEARNING NEURAL NETWORK

(71) Applicant: ADP, LLC, Roseland, NJ (US)

(72) Inventors: Hongguo An, Pasadena, CA (US); Akshay Chopra, Pasadena, CA (US); Paren Desai, Pasadena, CA (US)

(73) Assignee: ADP, LLC, Roseland, NJ (US)

( * ) Notice: Subject to any disclaimer, the term of this patent is extended or adjusted under 35 U.S.C. 154(b) by 228 days.

(21) Appl. No.: 16/510,513

(22) Filed: Jul. 12, 2019

(65) Prior Publication Data

US 2021/0011974 A1     Jan. 14, 2021

(51) Int. Cl.
| | |
|---|---|
| *G06F 40/295* | (2020.01) |
| *G06K 9/62* | (2006.01) |
| *G06N 3/04* | (2006.01) |
| *G06F 40/284* | (2020.01) |

(52) U.S. Cl.
CPC .......... *G06F 40/295* (2020.01); *G06F 40/284* (2020.01); *G06K 9/6267* (2013.01); *G06N 3/0454* (2013.01)

(58) Field of Classification Search
CPC ... G06F 40/295; G06F 40/284; G06K 9/6267; G06K 9/6271; G06K 9/00442; G06K 2209/01; G06N 3/0454
USPC .......................................................... 704/9
See application file for complete search history.

(56) References Cited

U.S. PATENT DOCUMENTS

| | | | |
|---|---|---|---|
| 9,318,109 B2 | 4/2016 | Boies et al. | |
| 10,984,245 B1* | 4/2021 | Tran ..................... | G06K 9/6229 |
| 2011/0246076 A1 | 10/2011 | Su et al. | |
| 2019/0065460 A1 | 2/2019 | Xin et al. | |
| 2020/0089755 A1* | 3/2020 | Shazeer ............... | G06K 9/6227 |
| 2020/0211077 A1* | 7/2020 | He ....................... | G06K 9/6256 |

OTHER PUBLICATIONS

Lample et al., "Neural Architectures for Named Entity Recognition," Proceedings of NAACL-HLT 2016, pp. 260-270, San Diego, California, Jun. 12-17, 2016.
Florez et al., "Named Entity Recognition using Neural Networks for Clinical Notes," Proceedings of Machine Learning Research, vol. 90, pp. 7-15, 2018.

(Continued)

*Primary Examiner* — Charlotte M Baker
(74) *Attorney, Agent, or Firm* — Yee & Associates, P.C.

(57) ABSTRACT

An illustrative embodiment provides a computer implemented method for extracting named entity information from full text includes obtaining text data from a document. The method also includes tokenizing the text data as numbers to produce a tokenized layer. The method also includes creating an embedded layer from the tokenized layer by encoding the text data by indices. The method also includes creating a one-dimensional Xception layer from the embedded layer according to a one-dimensional convolution. The method also includes determining a sequence of classification for the text data according to the one-dimensional Xception layer. The method also includes determining a named entity value from the text data according to the sequence of classification, wherein each sequence of classification predicts one character of the named entity value.

42 Claims, 48 Drawing Sheets

(56) References Cited

OTHER PUBLICATIONS

Villarroya, "Interpretability in sequence tagging models for Named Entity Recognition," Master Thesis, University of Amsterdam, Aug. 14, 2018.
Yadav et al., "A Survey on Recent Advances in Named Entity Recognition from Deep Learning Models," Proceedings of the 27th International Conference on Computational Linguistics, pp. 2145-2158, Santa Fe, New Mexico, Aug. 20-26, 2018.
Jing Li et al., "A Survey on Deep Learning for Named Entity Recognition," arXiv:1812.09449v1, Dec. 22, 2018.

* cited by examiner

TO FIG. 7B

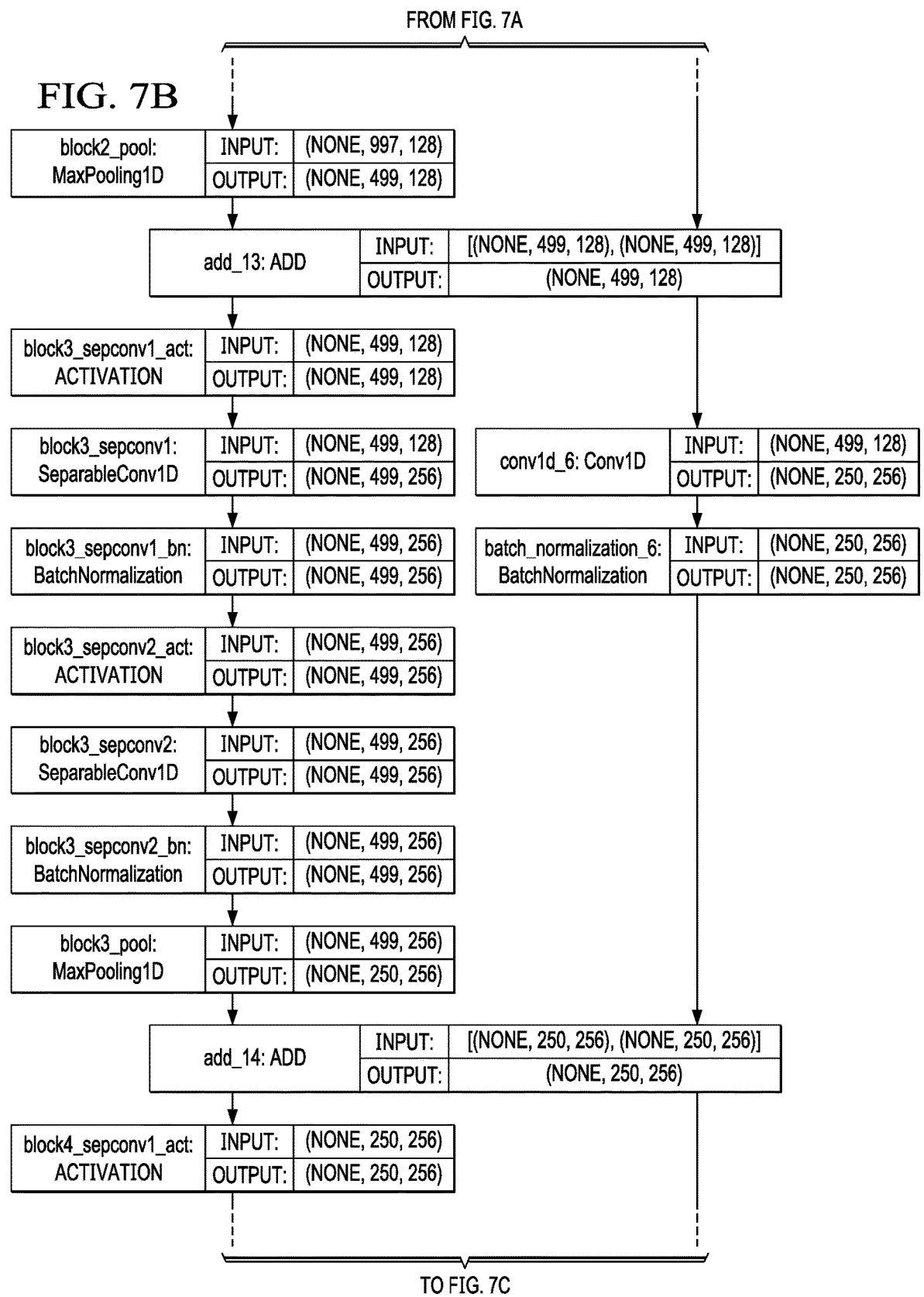

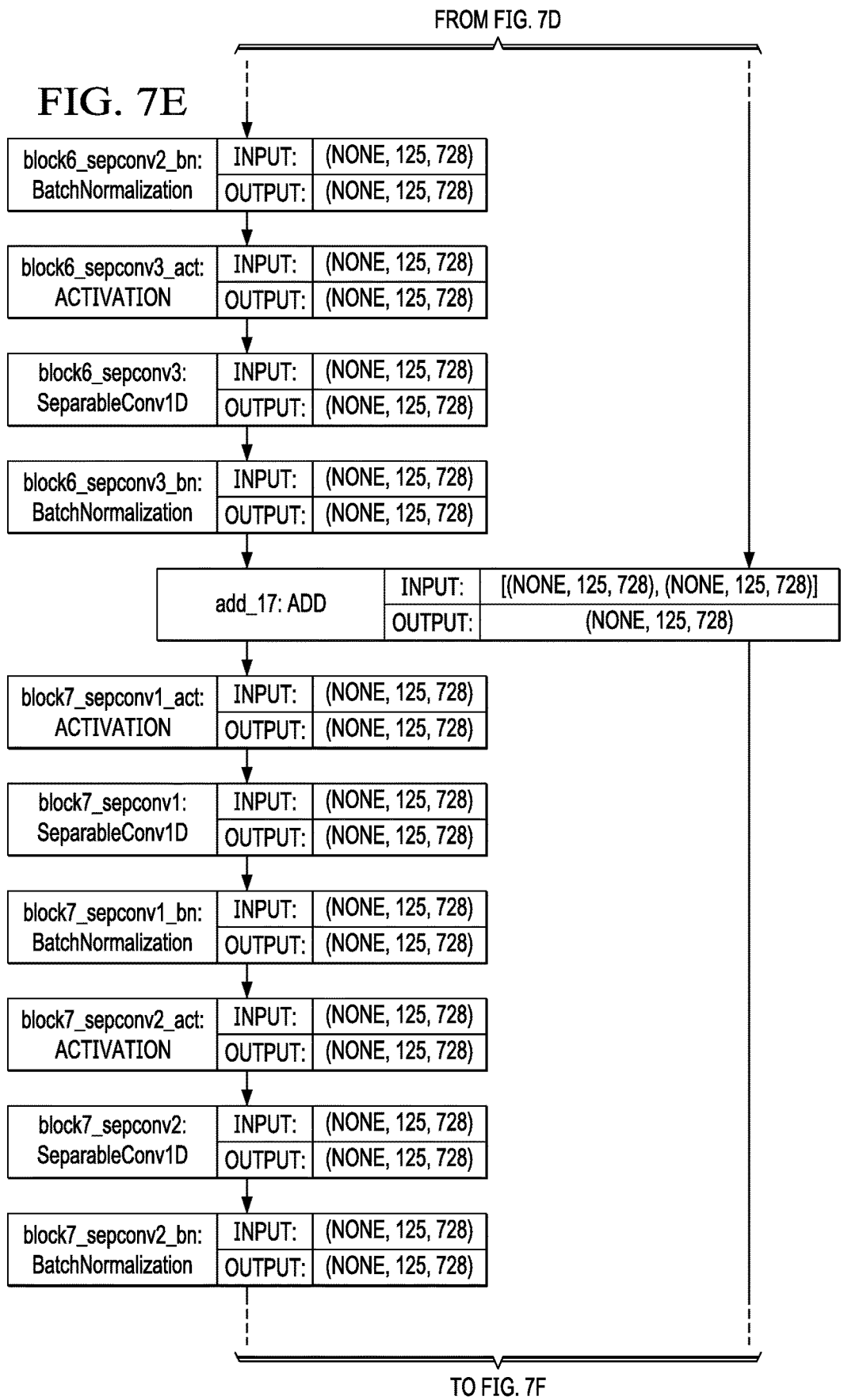

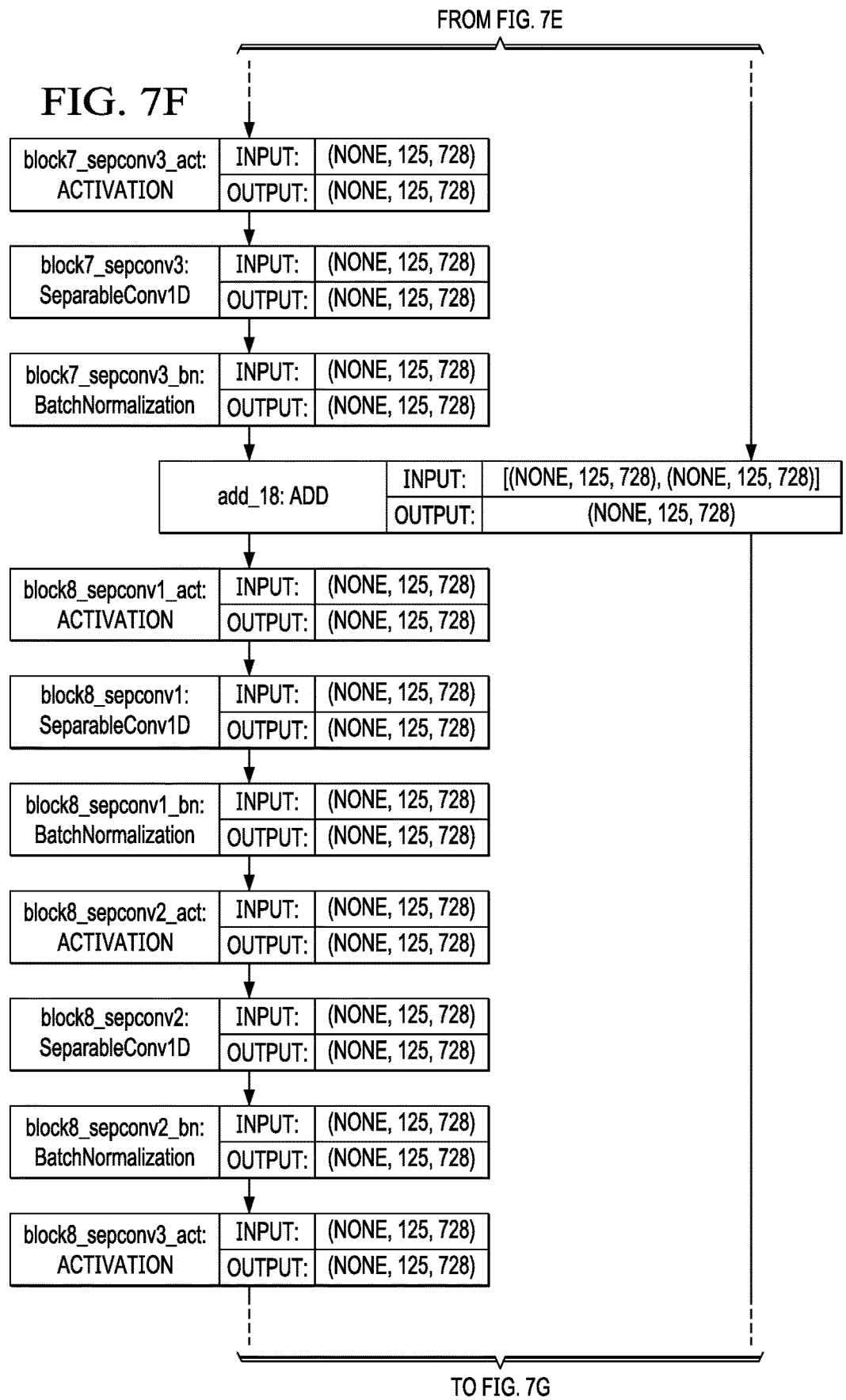

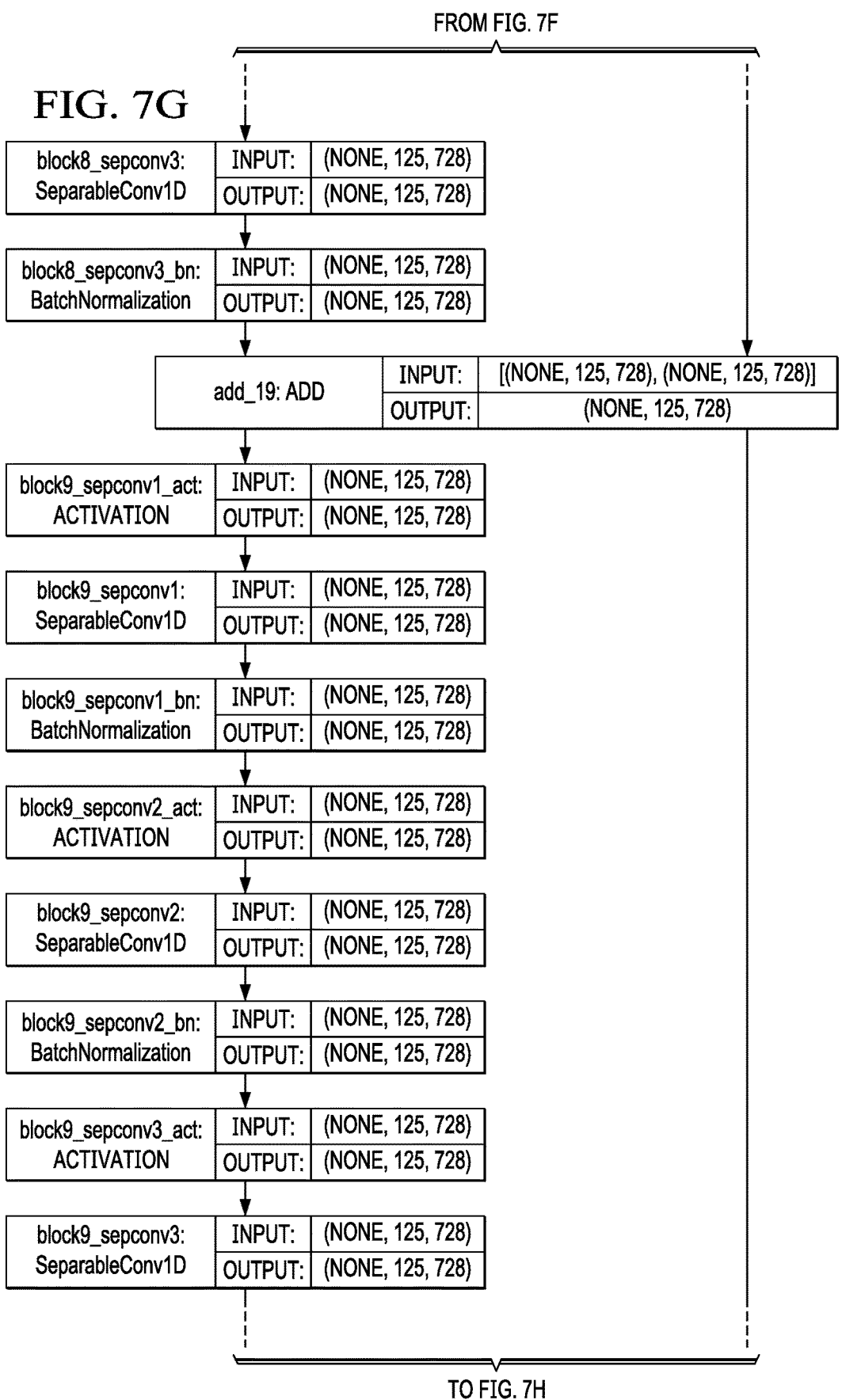

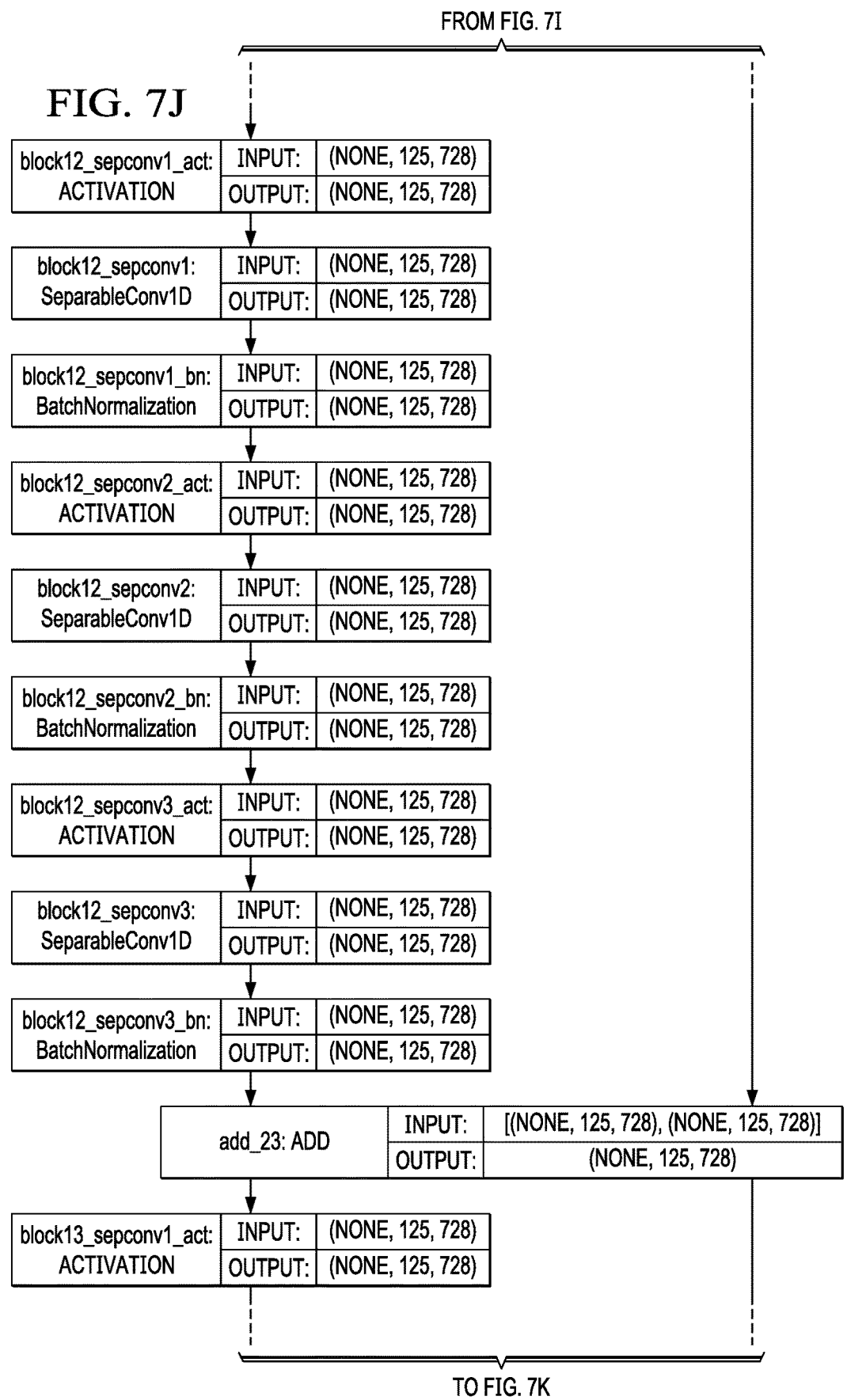

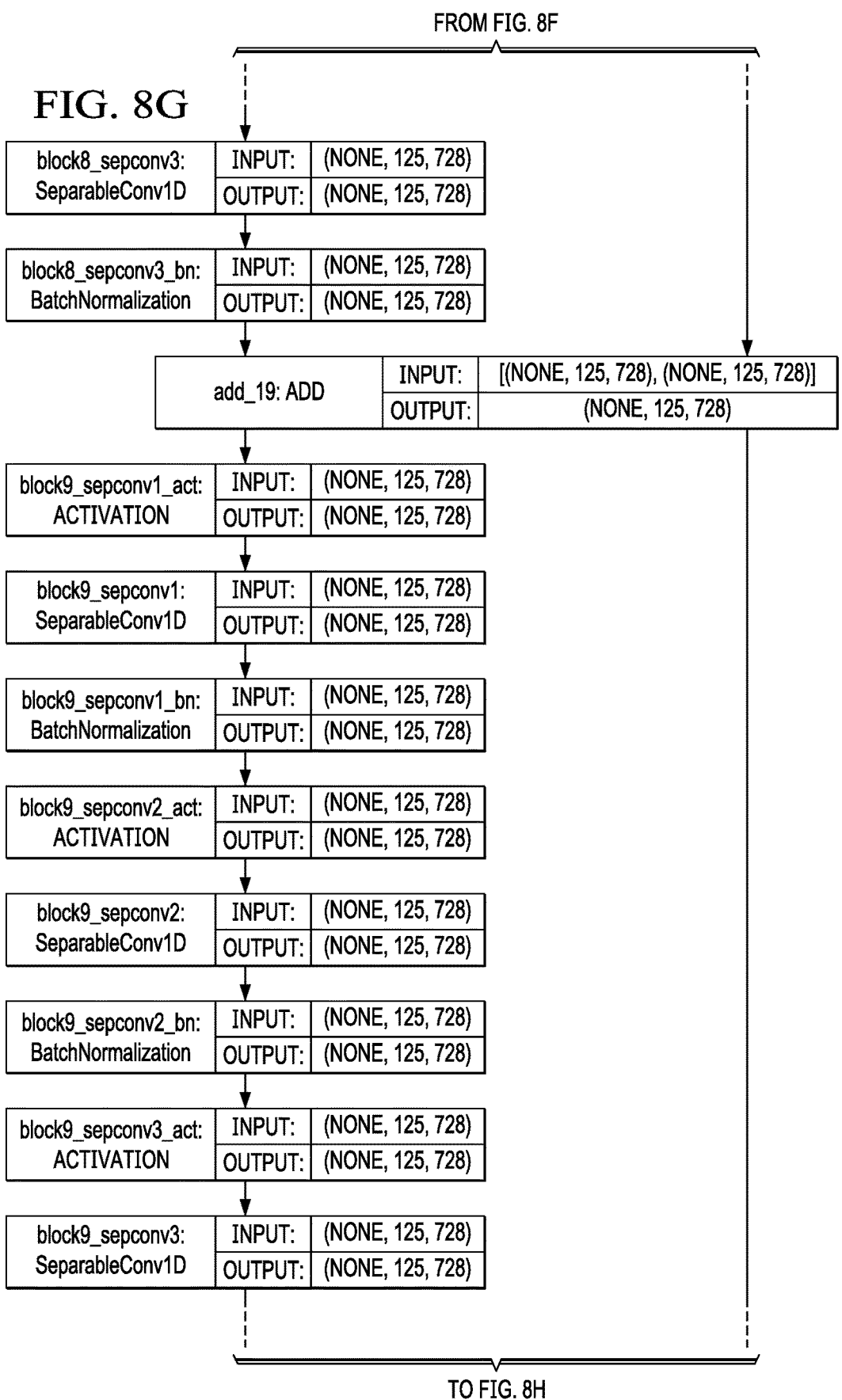

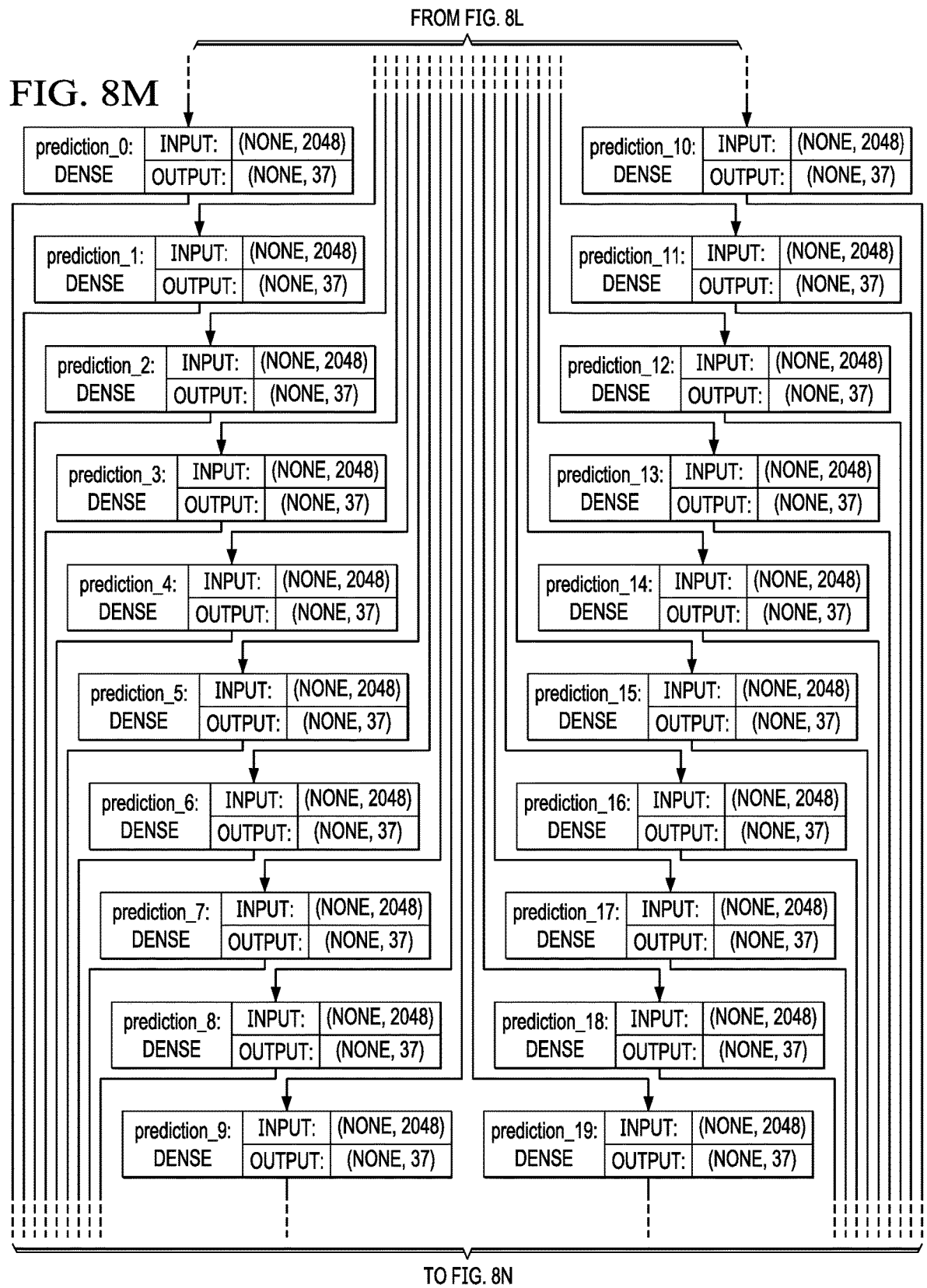

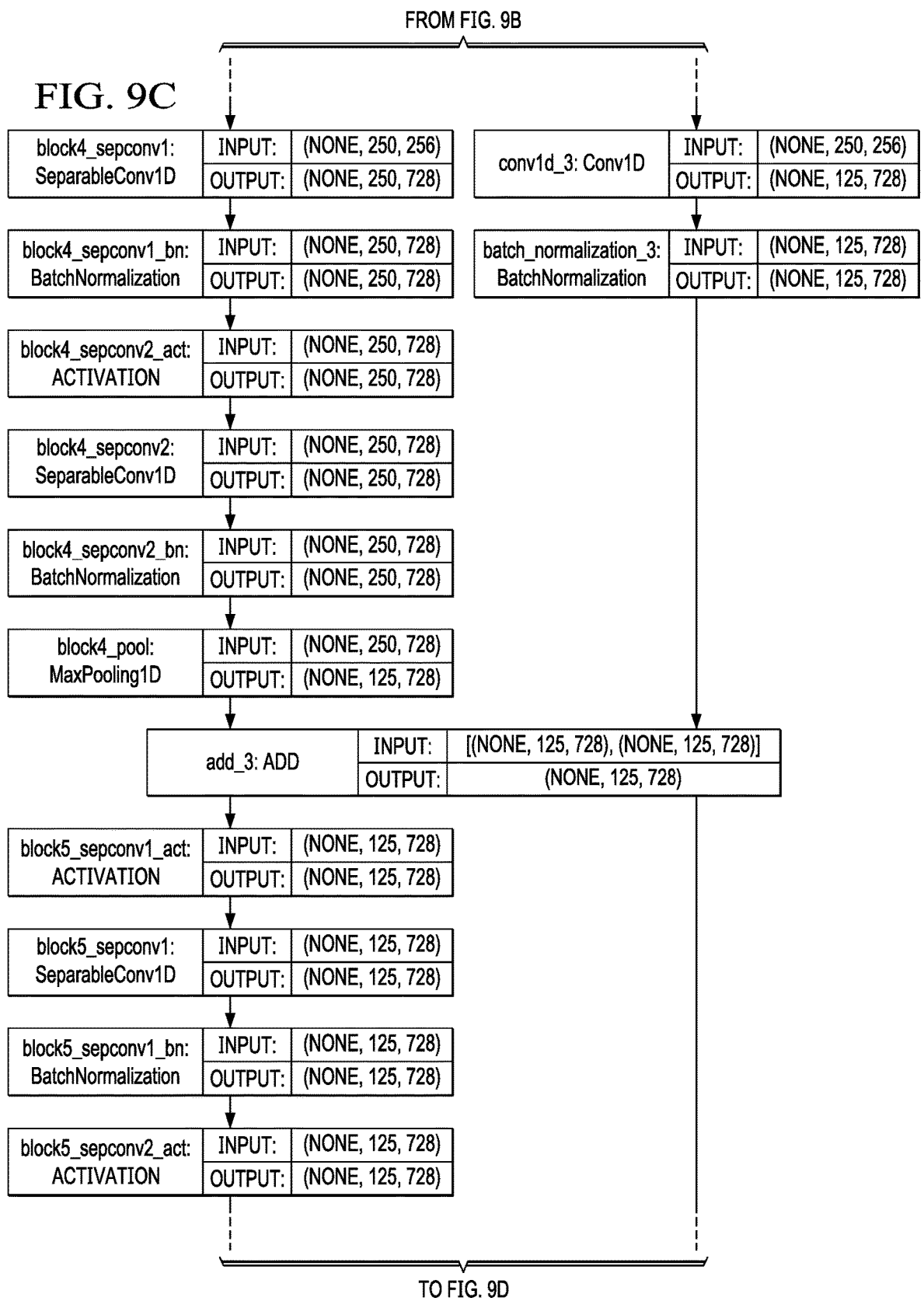

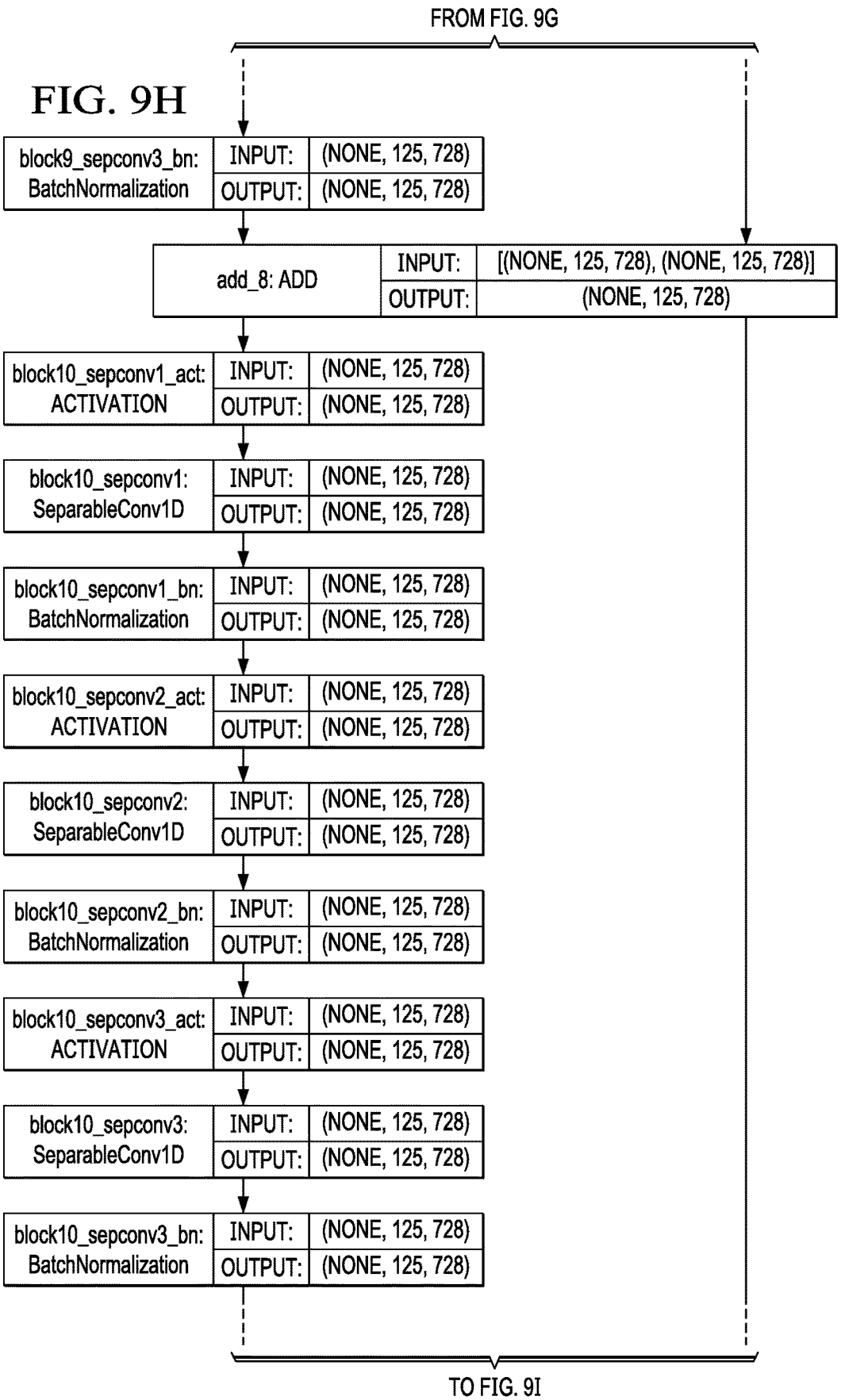

NAMED-ENTITY RECOGNITION THROUGH SEQUENCE OF CLASSIFICATION USING A DEEP LEARNING NEURAL NETWORK

BACKGROUND INFORMATION

1. Field

The present disclosure relates generally to an improved computer system and, in particular, to an improved system for named-entity recognition and, even more particularly, to an improved system for named-entity recognition through sequence classification using a deep learning neural network.

2. Background

A named entity (NE) is a real-world object, such as persons, locations, organizations, products, etc., that can be denoted with a proper name. It can be abstract or have a physical existence. Examples of named entities include Barack Obama, New York City, Volkswagen Golf, or anything else that can be named. Named entities can simply be viewed as entity instances (e.g., New York City is an instance of a city).

Named-entity recognition (NER) (also known as entity identification, entity chunking and entity extraction) is a subtask of information extraction that seeks to locate and classify named entity mentions in unstructured text into pre-defined categories such as the person names, organizations, locations, medical codes, time expressions, quantities, monetary values, percentages, etc.

Classical natural language processing (NLP) NER techniques extract field information from full text requires training the system and needs, in addition to the full text, for each entity, a start and end position of the NE in the full text and the type of the entity. This requirement brings with it several disadvantages. For example, the full text needs to be annotated first to find the start and end position of entity and this might not work well in the case of bad optical character recognition (OCR), in cases in which the text is provided in a column format for which OCR often mixes lines from different columns into one line causing annotation failure to find the entity, and in cases of data format variation, such as different date format (e.g., 2018/01/01 or Jan. 1 2018) making it difficult to annotate the entity. Furthermore, model may predict more than one result for the same entity, with different values, making it difficult to utilize the classical NLP NER. Therefore, an improved system and method for NLP NER addressing these and or other problems is desirable.

SUMMARY

An illustrative embodiment provides a computer implemented method for extracting named entity information from full text includes obtaining text data from a document. The method also includes tokenizing the text data as numbers to produce a tokenized layer. The method also includes creating an embedded layer from the tokenized layer by encoding the text data by indices. The method also includes creating a one-dimensional Xception layer from the embedded layer according to a one-dimensional convolution. The method also includes determining a sequence of classification for the text data according to the one-dimensional Xception layer. The method also includes determining a named entity value from the text data according to the sequence of classification, wherein each sequence of classification predicts one character of the named entity value.

Another illustrative embodiment provides a computer for extracting named entity information from full text includes a processor and a non-transitory computer readable storage medium storing program code which, when executed by the processor, performs a computer-implemented method extracting named entity information from full text. The program code includes instructions for obtaining text data from a document. The program code also includes instructions for tokenizing the text data as numbers to produce a tokenized layer. The program code also includes instructions for creating an embedded layer from the tokenized layer by encoding the text data by indices. The program code also includes instructions for creating a one-dimensional Xception layer from the embedded layer according to a one-dimensional convolution. The program code also includes instructions for determining a sequence of classification for the text data according to the one-dimensional Xception layer. The program code also includes instructions for determining a named entity value from the text data according to the sequence of classification, wherein each sequence of classification predicts one character of the named entity value.

Yet another illustrative embodiment provides a computer program product for extracting named entity information from full text includes a non-transitory computer readable storage medium having program instructions embodied therewith. The program instructions are executable by a number of processors to cause the computer to perform a number of steps. The steps include obtaining text data from a document. The steps also include tokenizing the text data as numbers to produce a tokenized layer. The steps also include creating an embedded layer from the tokenized layer by encoding the text data by indices. The steps also include creating a one-dimensional Xception layer from the embedded layer according to a one-dimensional convolution. The steps also include determining a sequence of classification for the text data according to the one-dimensional Xception layer. The steps also include determining a named entity value from the text data according to the sequence of classification, wherein each sequence of classification predicts one character of the named entity value.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIGS. 7A-7L show a use case diagram illustrating a method for determining a sequence of classification according to method 400 in accordance with an illustrative embodiment.

FIGS. 9A-9L show a use case diagram illustrating a method for determining a sequence of classification according to method 600 in accordance with an illustrative embodiment.

DETAILED DESCRIPTION

The illustrative embodiments recognize and take into account one or more different considerations. For example, the illustrative embodiments recognize and take into account that training on traditional NLP NER requires an input of full text and, for each entity, a start position in the full text, an end position in the full text, and a type of the entity. The illustrative embodiments further recognize and take into account that traditional NLP NER requires the full text to be annotated first to find the start and end position for each entity. The illustrative embodiments further recognize and take into account that traditional NLP NER may not work well in the case of poor OCR quality. The illustrative embodiments further recognize and take into account that when text is in a column format, OCR may mix lines from different columns into one line thereby causing annotation failure to find the entity in traditional NLP NER.

Illustrative embodiments provide sequence classification of text in order to extract field information from full text. Illustrative embodiments further provide a deep learning neural network (NN) to provide sequence classification with the last layers producing a sequence of classification. Illustrative embodiments work with full text that is in column format as well as with full text that is not in column format. Illustrative embodiments do not require annotation of the full text prior to extracting field information from full text.

Figure 1:
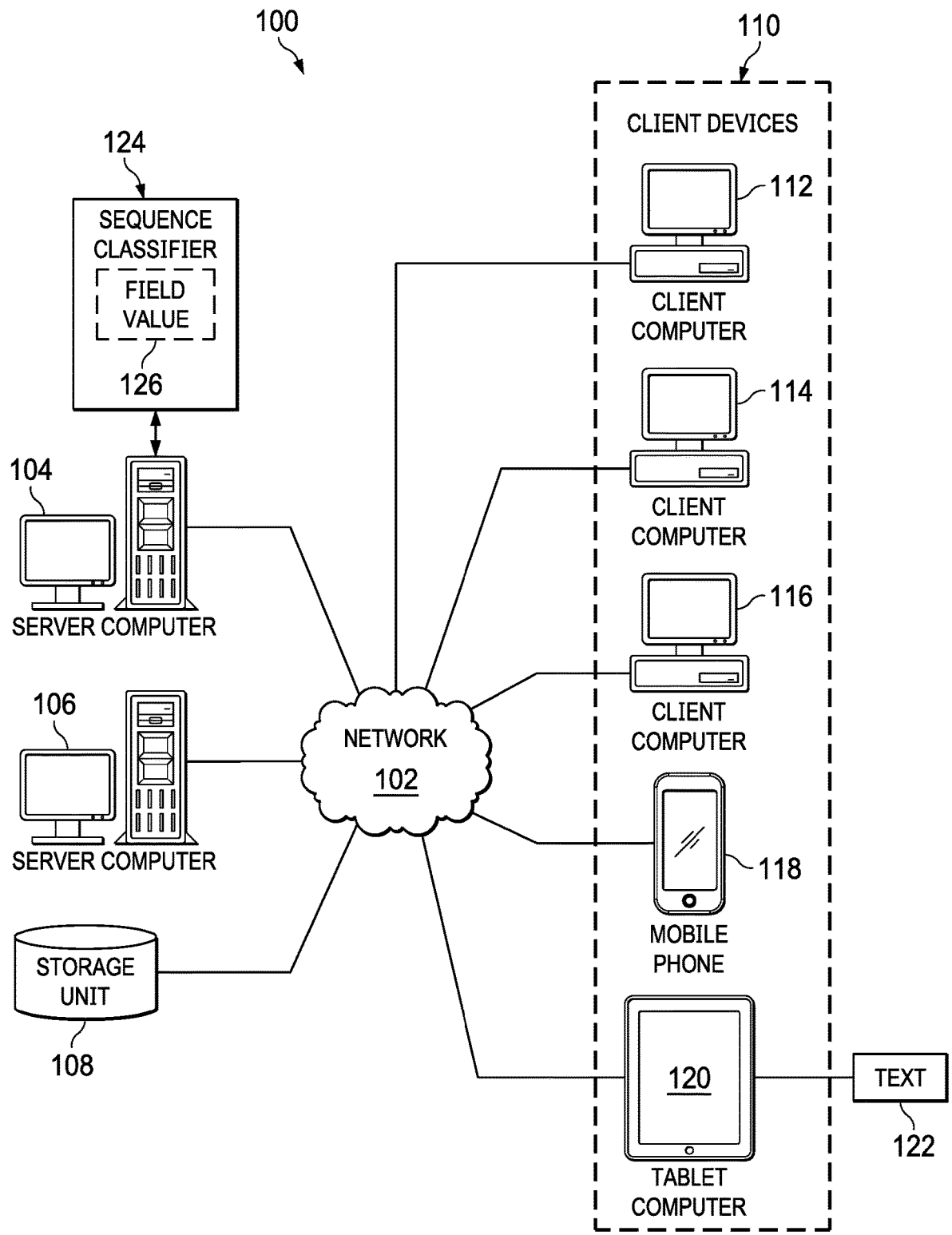
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. Further, client devices 110 can also include other types of client devices such as mobile phone 118, and tablet computer 120. In the depicted example, server computer 104 provides information, such as boot files, operating system images, and applications to client devices 110. In this illustrative example, server computer 104, server computer 106, storage unit 108, and client devices 110 are network devices that connect to network 102 in which network 102 is the communications media for these network devices.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Text may be entered into one of client devices 110. As depicted, text 122 is entered into tablet computer 120. Text 122 is transmitted by tablet computer 120 to server computer 104. Sequence classifier 124 extracts field values 126 from text 122. Sequence classifier 124 uses machine learning such as a deep learning neural network to sequence text 122 in order to extract field values 126.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Figure 2:
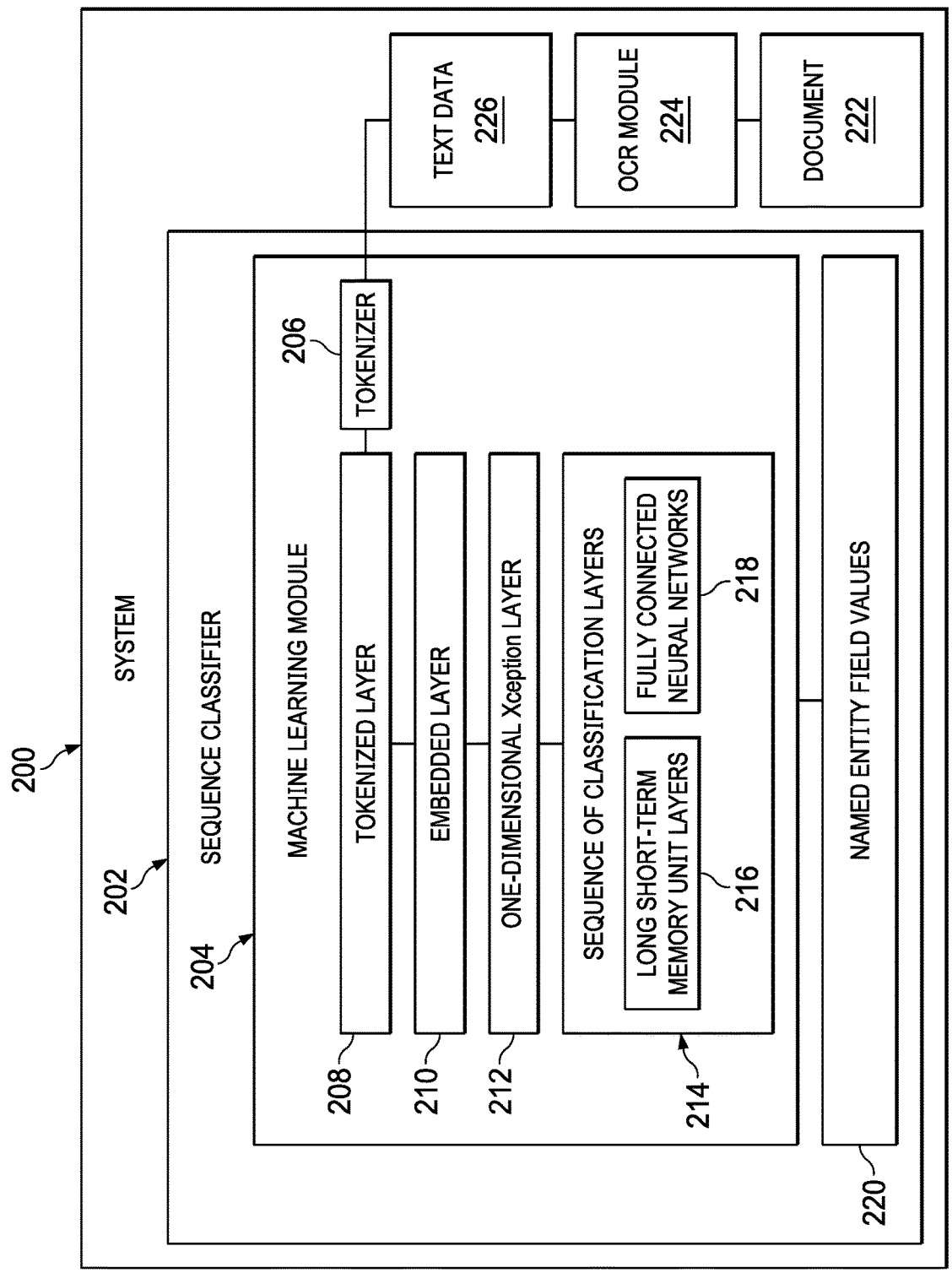
FIG. 2 is a block diagram of a system for extracting named entity information from full text in accordance with an illustrative embodiment.

Turning now to FIG. 2, a block diagram of a system for extracting named entity information from full text is depicted in accordance with an illustrative embodiment. System 200 may be implemented as, for example, server computer 104 in FIG. 1. System 200 includes a sequence classifier 202 that extracts named entity field values 220 from a document 222. System 200 includes an optical character recognition module 224 that scans document 222 to extract text data 226. Sequence classifier 202 includes a machine learning module 204 that extracts named entity field values 220 from text data 226. Machine learning module 204 includes a tokenizer 206 that creates tokenizes (i.e., converts the text to numerical values) text data 226 to create a tokenized layer 208. Machine learning module 204 creates an embedded layer 210 from the tokenized layer 208 and creates a one-dimensional Xception layer 212 from the embedded layer 210. A number of sequence of classification layers 214 are created from one-dimensional Xception layer 212. In various embodiments, sequence of classification layers 214 includes one or more LSTM layers 216 and/or one or more fully connected neural networks (NN) 218. Machine learning module 204 extracts named entity field values 220 from the last layers provided in sequence of classification layers 214. Additional details and various embodiments for the functioning of the sequence classifier 202 and the machine learning module 204 are provided below.

Figure 3:
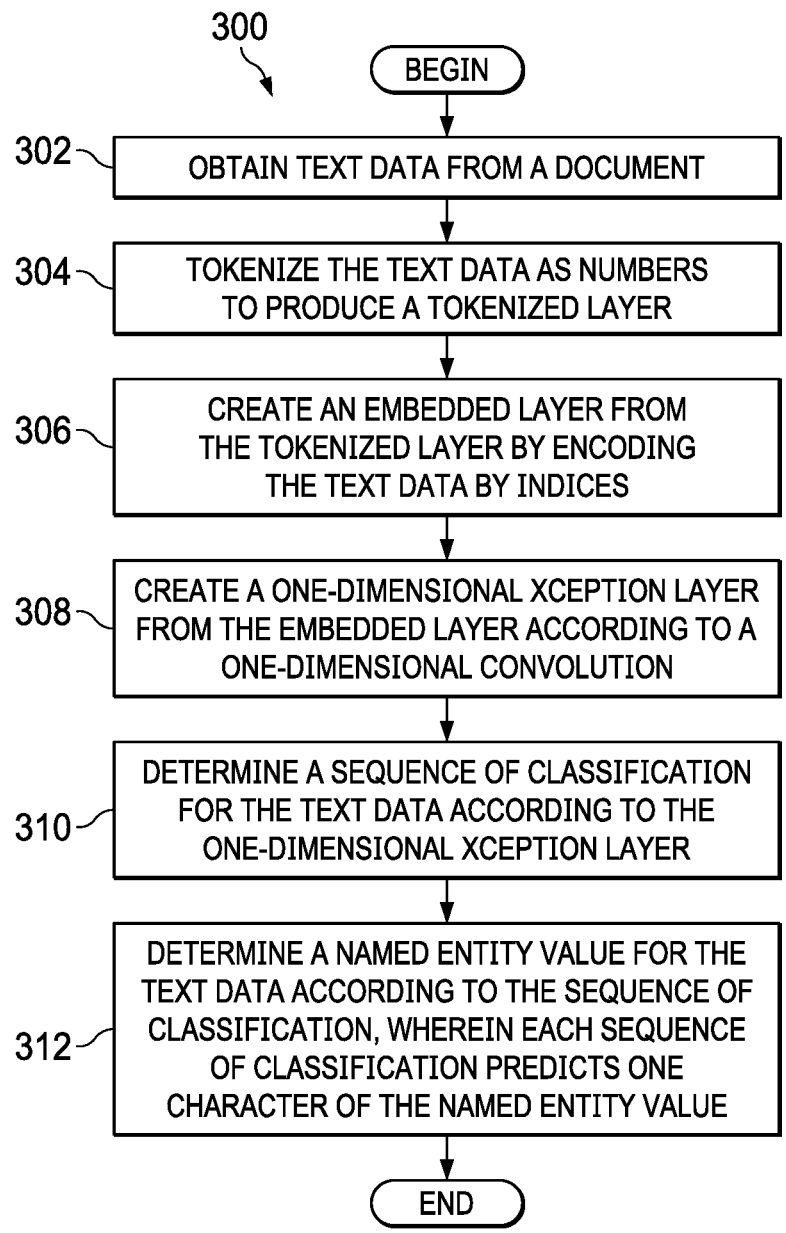
FIG. 3 is a flowchart of a method for extracting named entity information from full text in accordance with an illustrative embodiment.

Turning now to FIG. 3, a flowchart of a method for extracting named entity information from full text is depicted in accordance with an illustrative embodiment. Method 300 may be implemented, for example, in system 200 depicted in FIG. 2. Method 300 begins by obtaining text data from a document (step 302). Next, method 300 tokenizes the text data as numbers to produce a tokenized layer (step 304). Next, an embedded layer is created from the tokenized layer by encoding the text data by indices (step 306). Next, a one-dimensional Xception layer is created from the embedded layer according to a one-dimensional convolution (step 308). As used herein, unless indicated otherwise either explicitly or by context, an Xception layer is an extreme inception layer, e.g., a modified depthwise separable convolution layer. Inception is a deep convolutional neural network architecture. A one-dimensional Xception layer is a modification of an Xception2D model created for image processing. Next, a sequence of classification for the text data is determined according to the one-dimensional Xception layer (step 310). Determining the sequence of classification in step 310 may be performed using several different methods described below with reference to FIGS. 4-6. Next, a named entity value for the text data is determined according to the sequence of classification, wherein each sequence of classification predicts one character of the named entity value (step 312), after which, method 300 may end.

Figure 4:
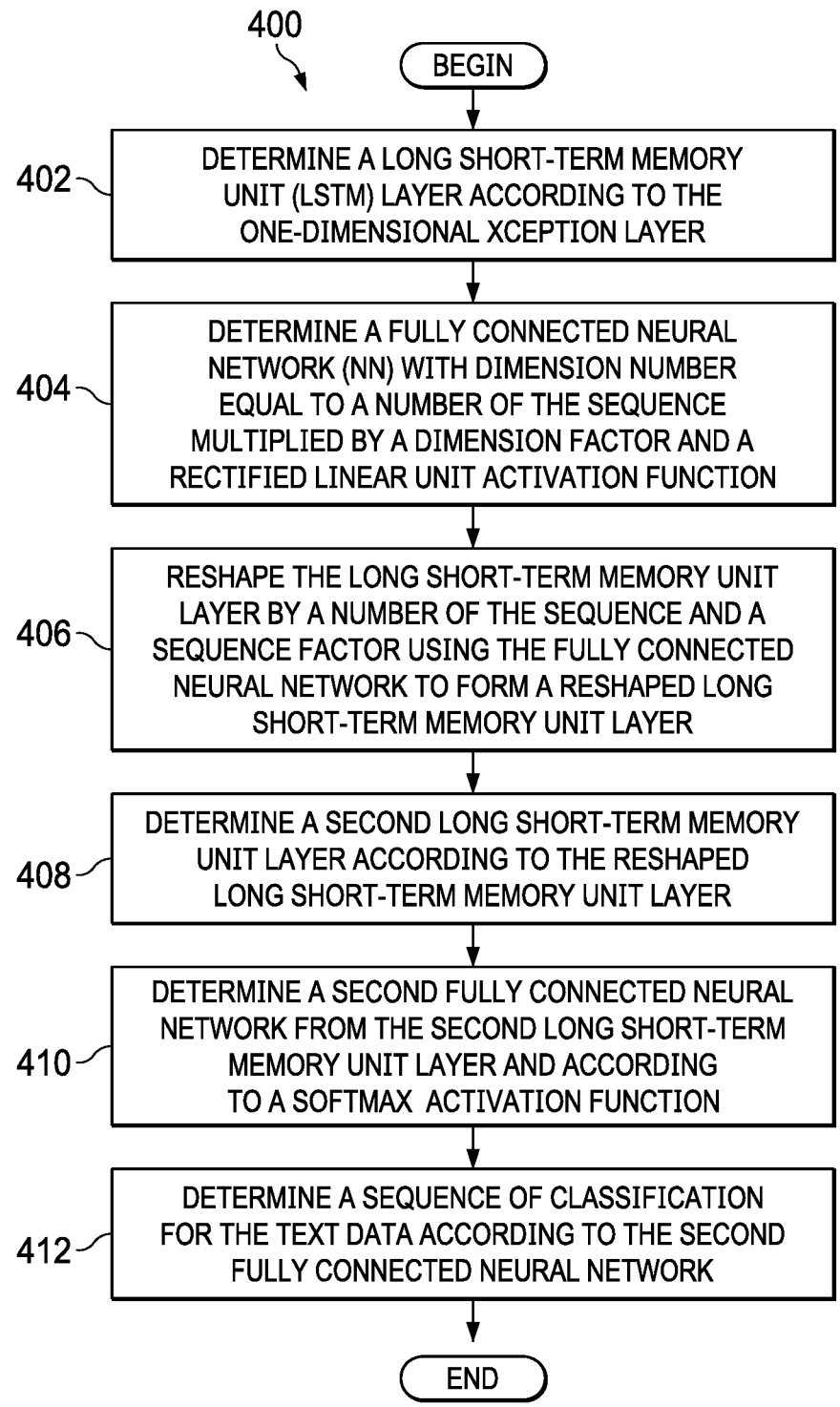
FIG. 4 is a flowchart of a method for determining a sequence of classification in accordance with an illustrative embodiment.

Turning now to FIG. 4, a flowchart of a method for determining a sequence of classification is depicted in accordance with an illustrative embodiment. Method 400 may be implemented as step 310 in FIG. 3. Method 400 begins by determining a long short-term memory unit (LSTM) layer according to the one-dimensional Xception layer (step 402). Next, method 400 determines a fully connected neural network (NN) with a dimension number equal to a number of the sequence multiplied by a dimension factor and a rectified linear unit (ReLU) activation function (step 404). In an illustrative embodiment, the ReLU activation function changes a model from linear to non-linear such that the model can fit a complex data model. In an embodiment, the dimension factor has a default value. In an embodiment, the default value is 64. Next, the LSTM layer is reshaped by a number of the sequence and by a sequence factor using the fully connected NN to form a reshaped LSTM layer (step 406). As used herein, unless indicated otherwise either explicitly or by conte4xt, reshape means to map data from one range to another range. For example, remapping the range of 0-255 to the range of 0-1 would mean that 0 would be mapped to 0, 255 would be mapped to 1, and the numbers in between 0 and 255 would be mapped between 0 and 1 accordingly. In an illustrative embodiment, the default dimension for the LSTM layer is 256 with a dropout rate of 0.5. As used herein, unless stated otherwise explicitly or by context, the term dropout means to ignore randomly selected neurons during training.

Next, a second LSTM layer is determined according to the reshaped LSTM layer (step 408). Next, a second fully connected neural network is determined from the second LSTM layer according to a SoftMax activation function (step 410). A SoftMax activation function is a function that takes as input a vector of K real numbers, and normalizes it into a probability distribution consisting of K probabilities. That is, prior to applying a SoftMax activation function, some vector components could be negative, or greater than one; and might not sum to 1; but after applying SoftMax, each component will be in the interval, and the components will add up to 1, so that they can be interpreted as probabilities. Next, a sequence of classification for the text data is determined according to the second fully connected neural network (step 412), after which, method 400 may end.

Figure 5:
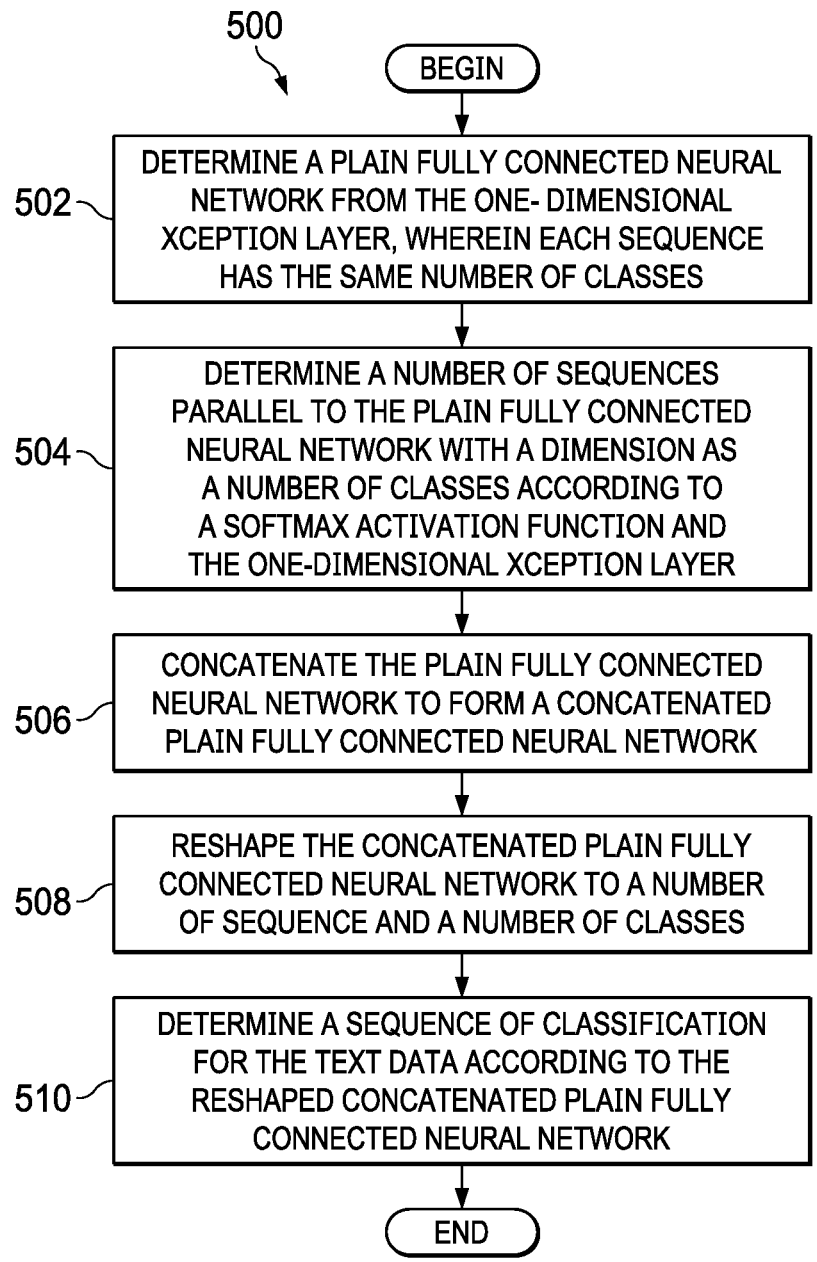
FIG. 5 is a flowchart of a method for determining a sequence of classification in accordance with an illustrative embodiment.

Turning now to FIG. 5, a flowchart of a method for determining a sequence of classification is depicted in accordance with an illustrative embodiment. Method 500 may be implemented as step 310 in FIG. 3. Method 500 begins by determining a plain fully connected neural network from the one-dimensional Xception layer, wherein each sequence has the same number of classes (step 502). Next, a number of sequence parallel to the plain fully connected neural network with a dimension as a number of classes is determined according to a SoftMax activation function and according to the one-dimensional Xception layer (step 504). Next, the plain fully connected neural network is concatenated to form a concatenated plain fully connected neural network (step 506). Next, the concatenated plain fully connected neural network is reshaped to a number of sequence and a number of classes (step 508). In an illustrative embodiment, each sequence of classification has a different number of classes. Next, a sequence of classification for the text data is determined according to the reshaped concatenated plain fully connected neural network (step 510), after which, method 500 may end.

Figure 6:
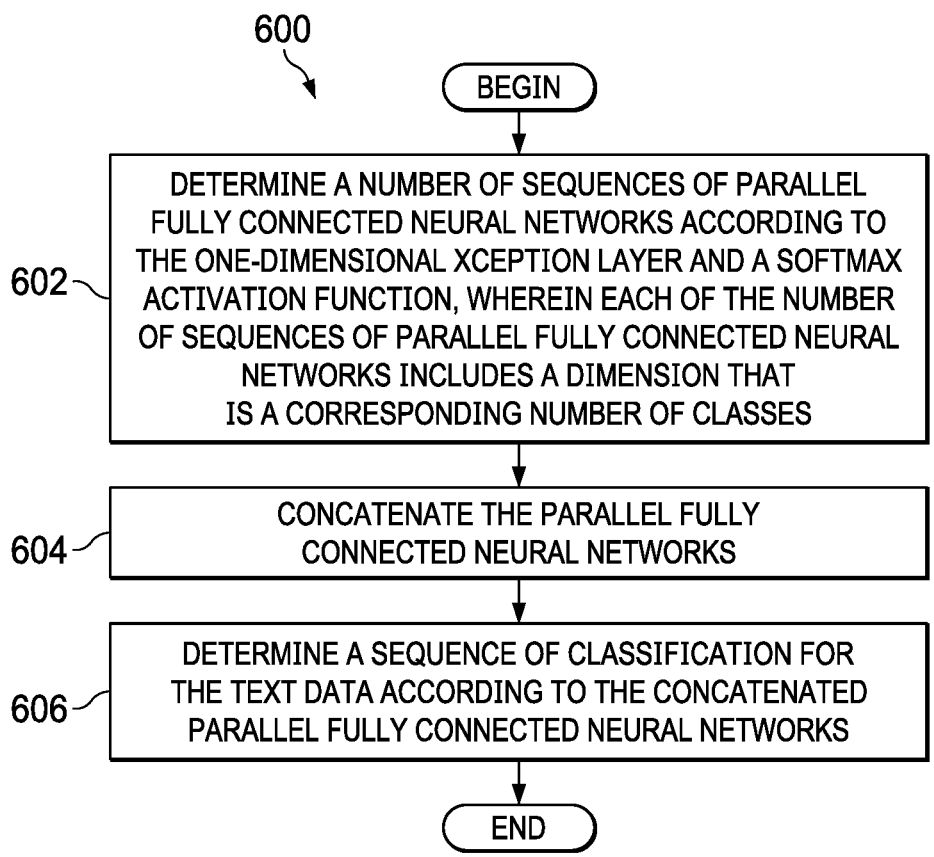
FIG. 6 is a flowchart of a method for determining a sequence of classification in accordance with an illustrative embodiment.
Figure 7A:
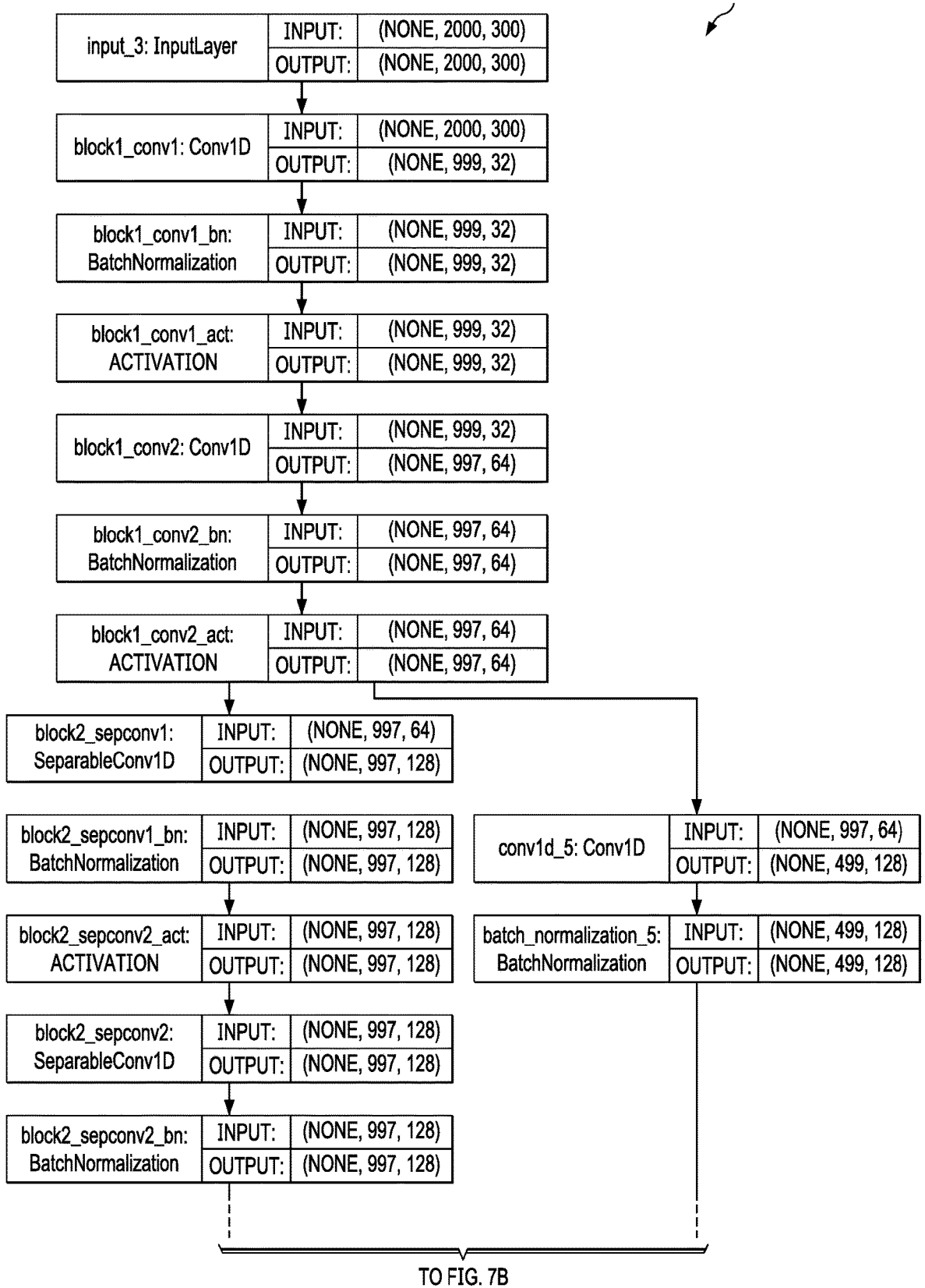
Figure 7C:
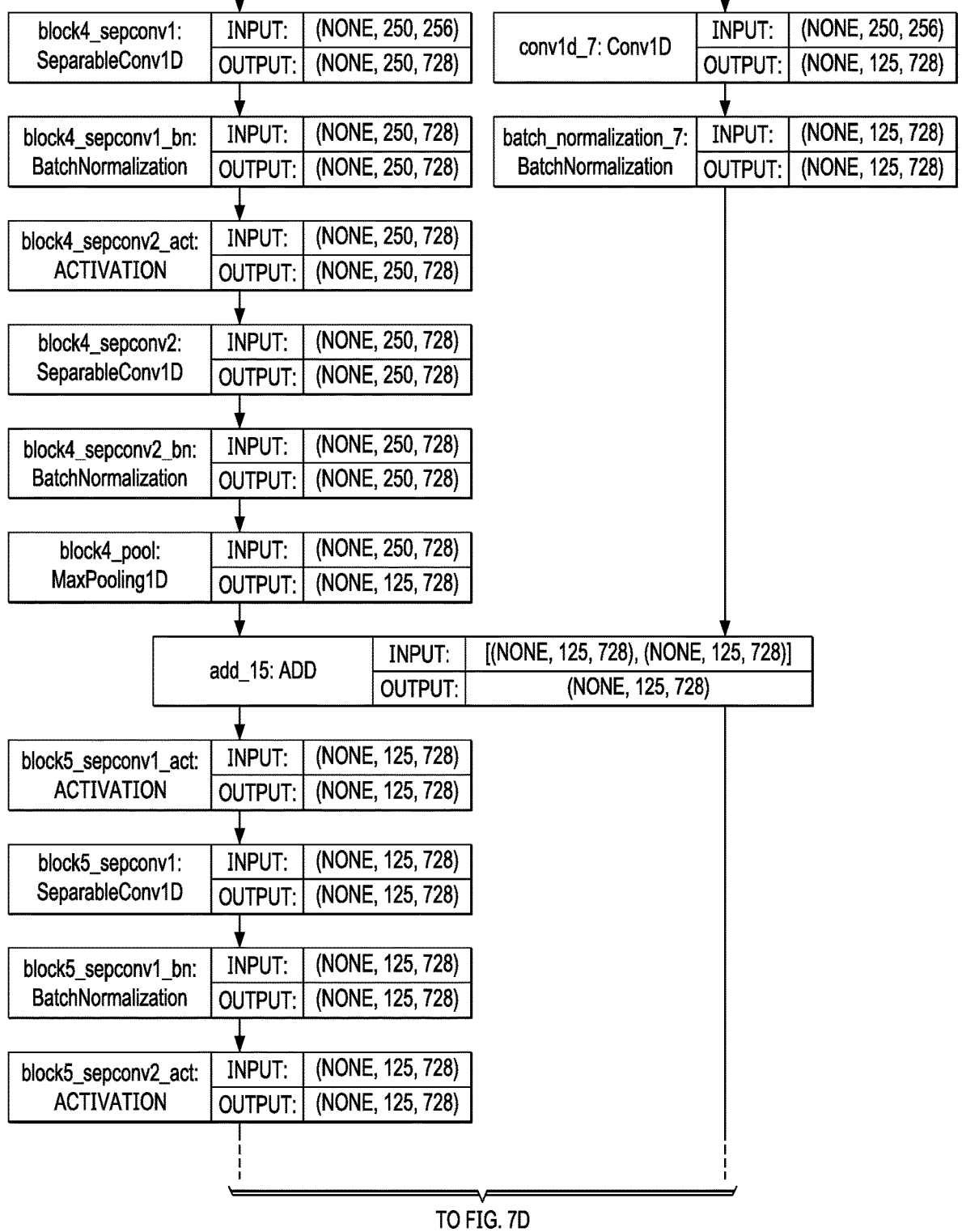
Figure 7D:
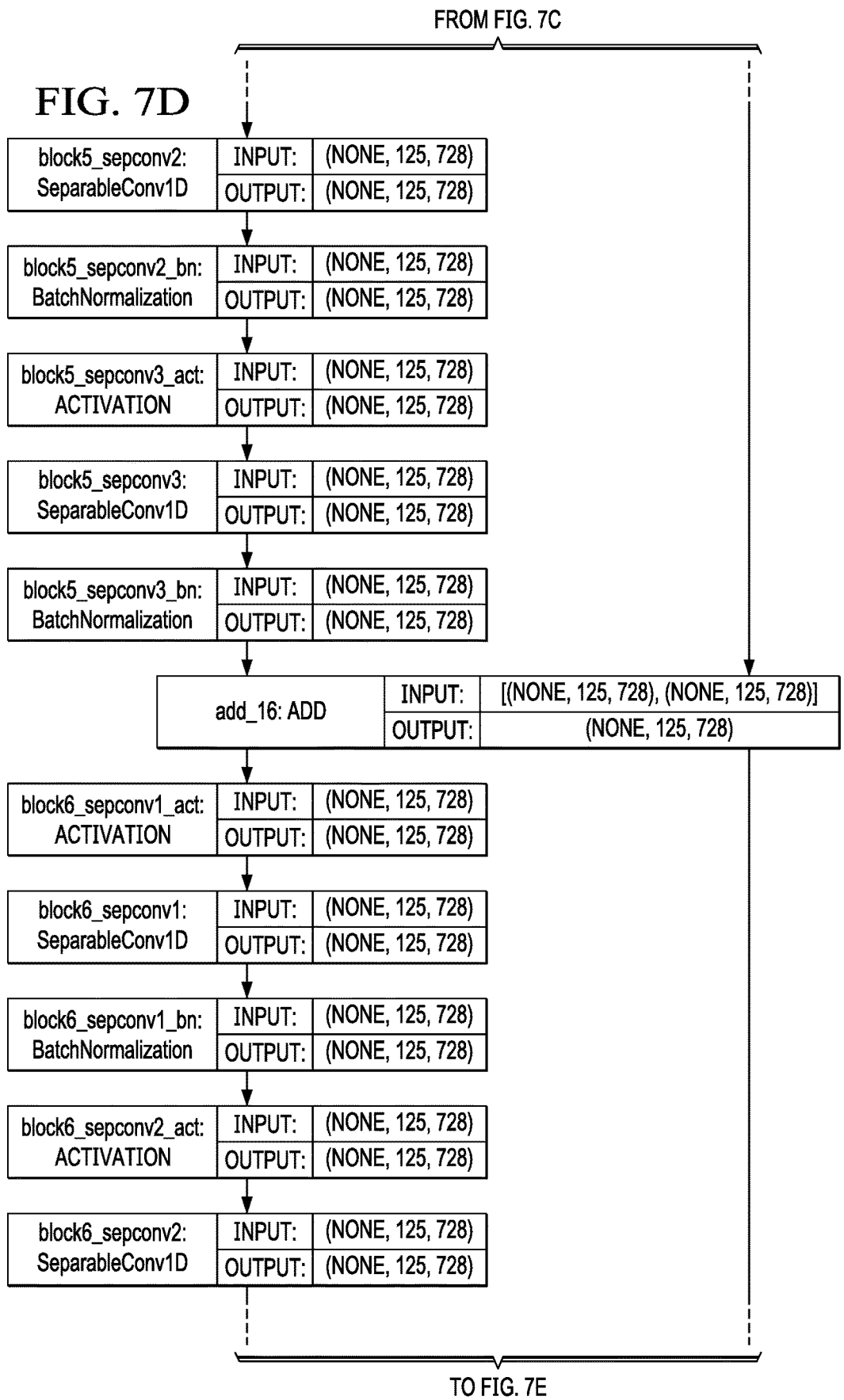
Figure 7H:
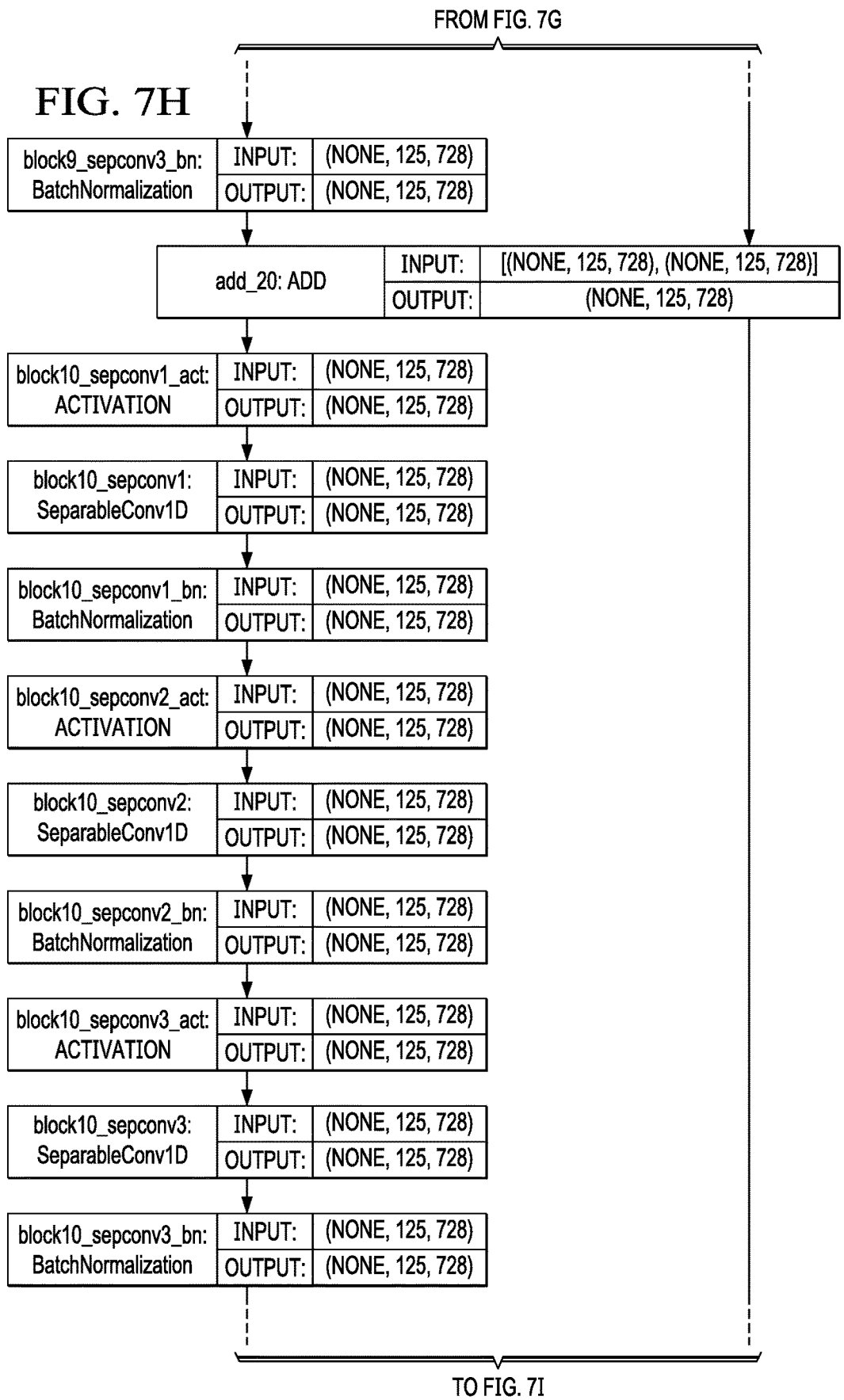
Figure 7I:
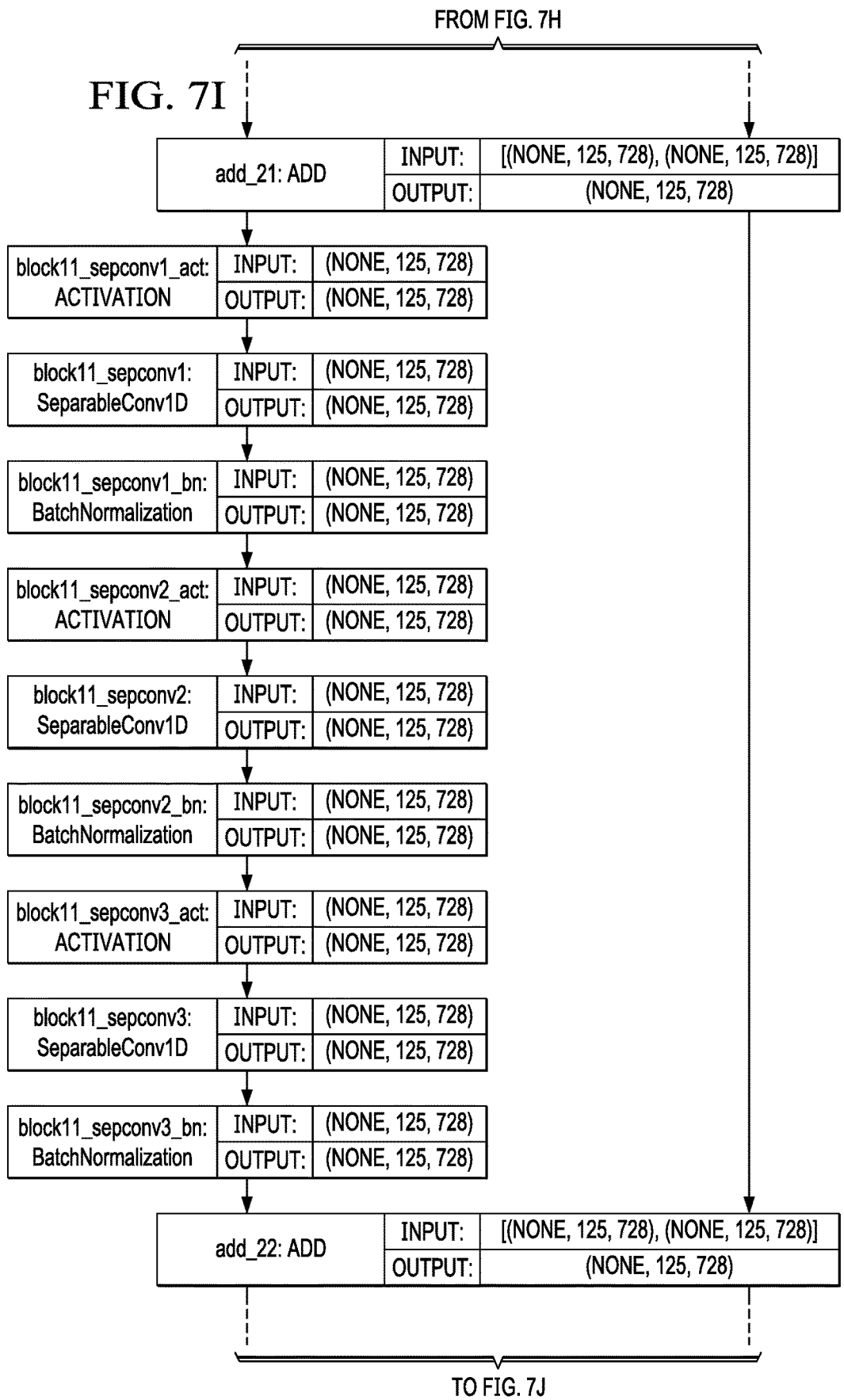
Figure 7K:
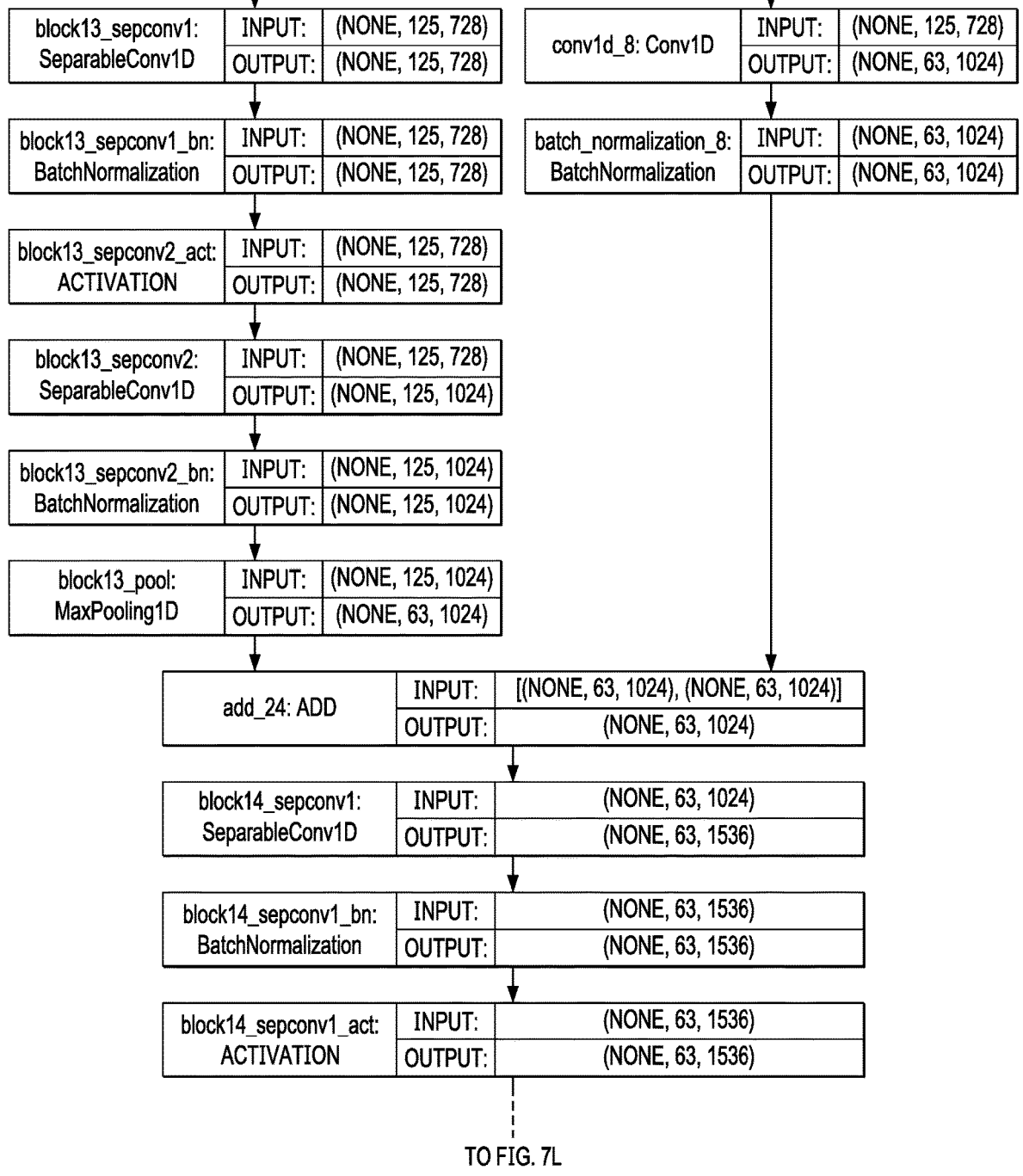
Figure 7L:
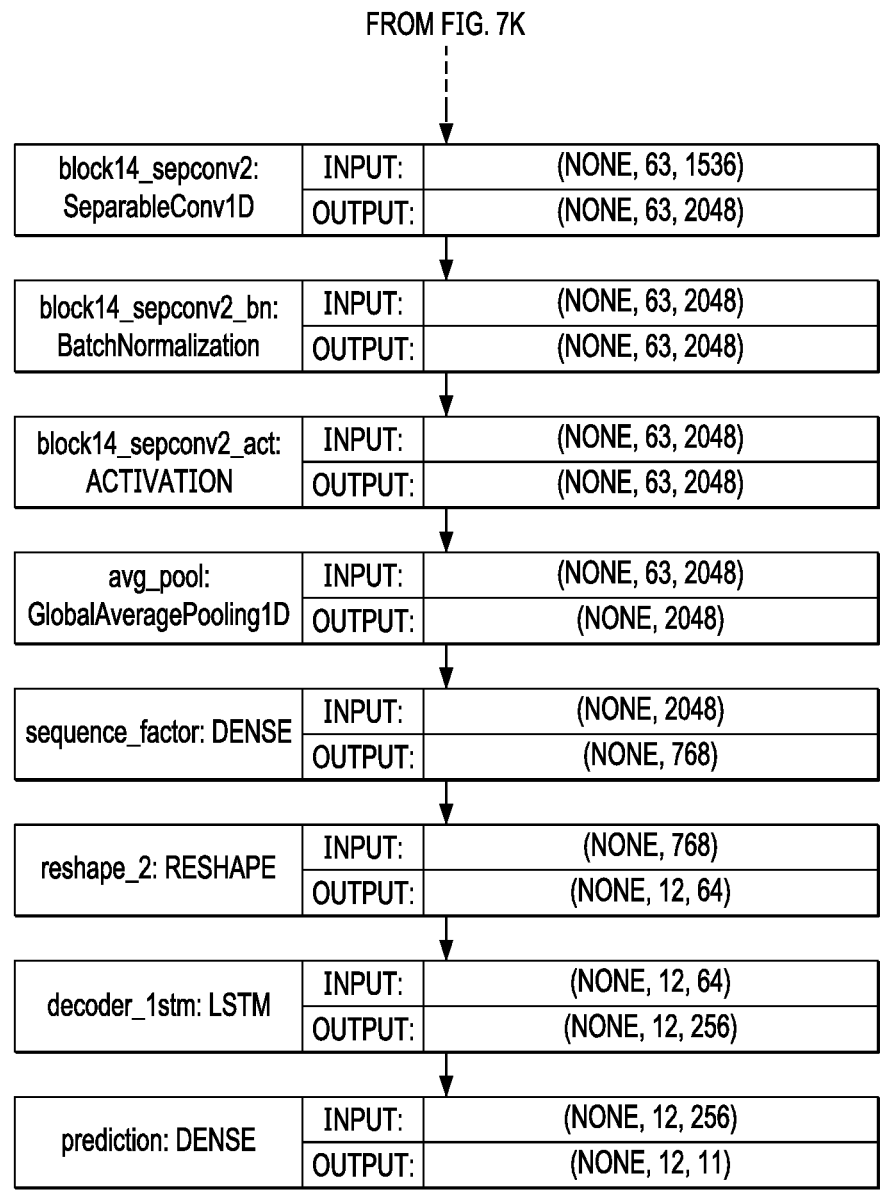

Turning now to FIG. 6, a flowchart of a method for determining a sequence of classification is depicted in accordance with an illustrative embodiment. Method 600 may be implemented as step 310 in FIG. 3. Method 600 begins by determining a number of sequences of parallel fully connected neural networks according to the one-dimensional Xception layer and a SoftMax activation function, wherein each of the number of sequences of parallel fully connected neural networks includes a dimension that is a corresponding number of classes (step 602). Next, the parallel fully connected neural networks are concatenated to form a concatenated parallel fully connected neural network (step 604). Next, a sequence of classification for the text data is determined according to the concatenated parallel fully connected neural network (step 606), after which, method 600 may end.

FIGS. 7A-7L show a use case diagram illustrating a method 700 for determining a sequence of classification according to method 400 in accordance with an illustrative embodiment.

Figure 8A:
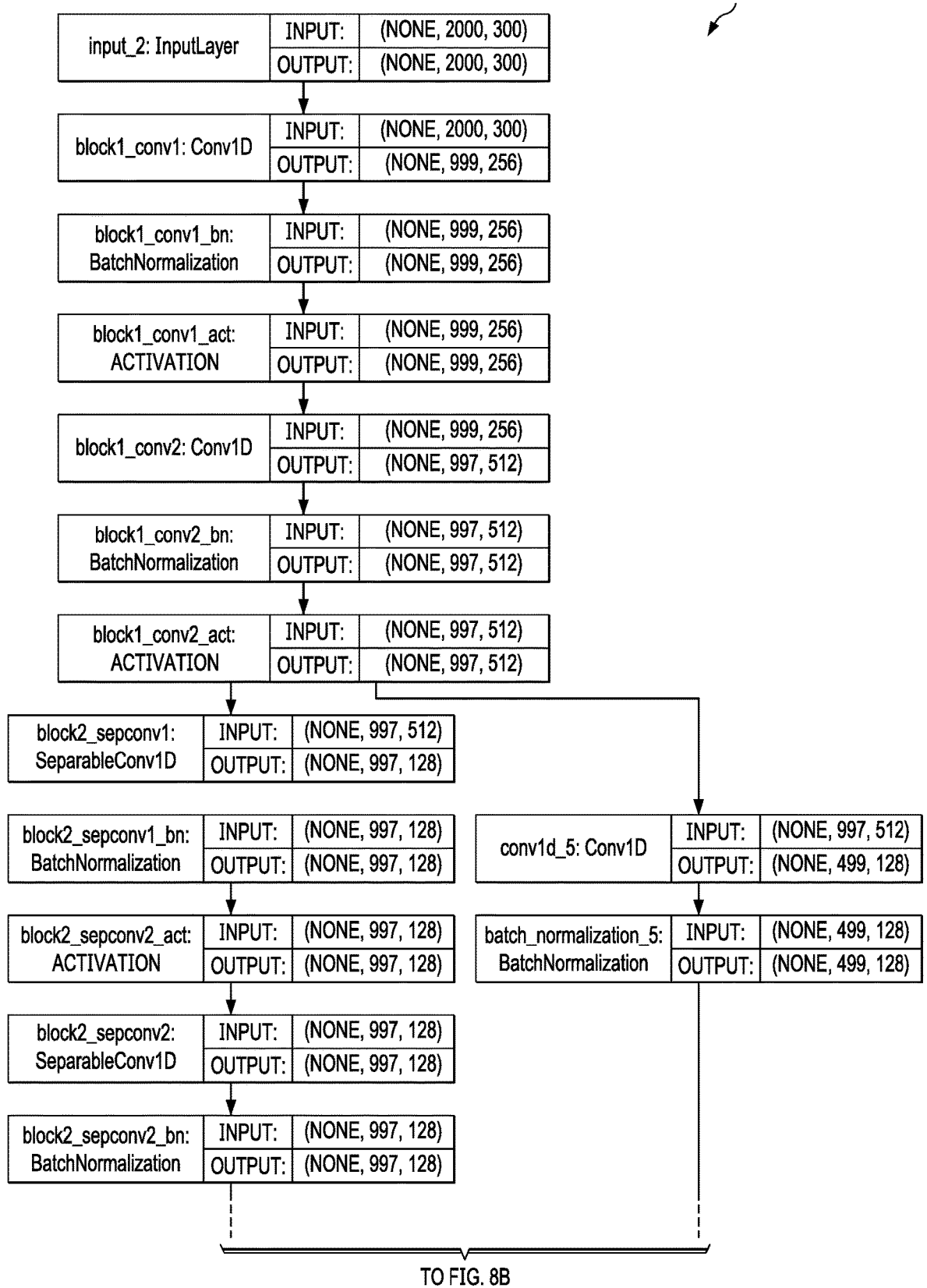
FIGS. 8A-8N show a use case diagram illustrating a method for determining a sequence of classification according to method 500 in accordance with an illustrative embodiment.
Figure 8B:
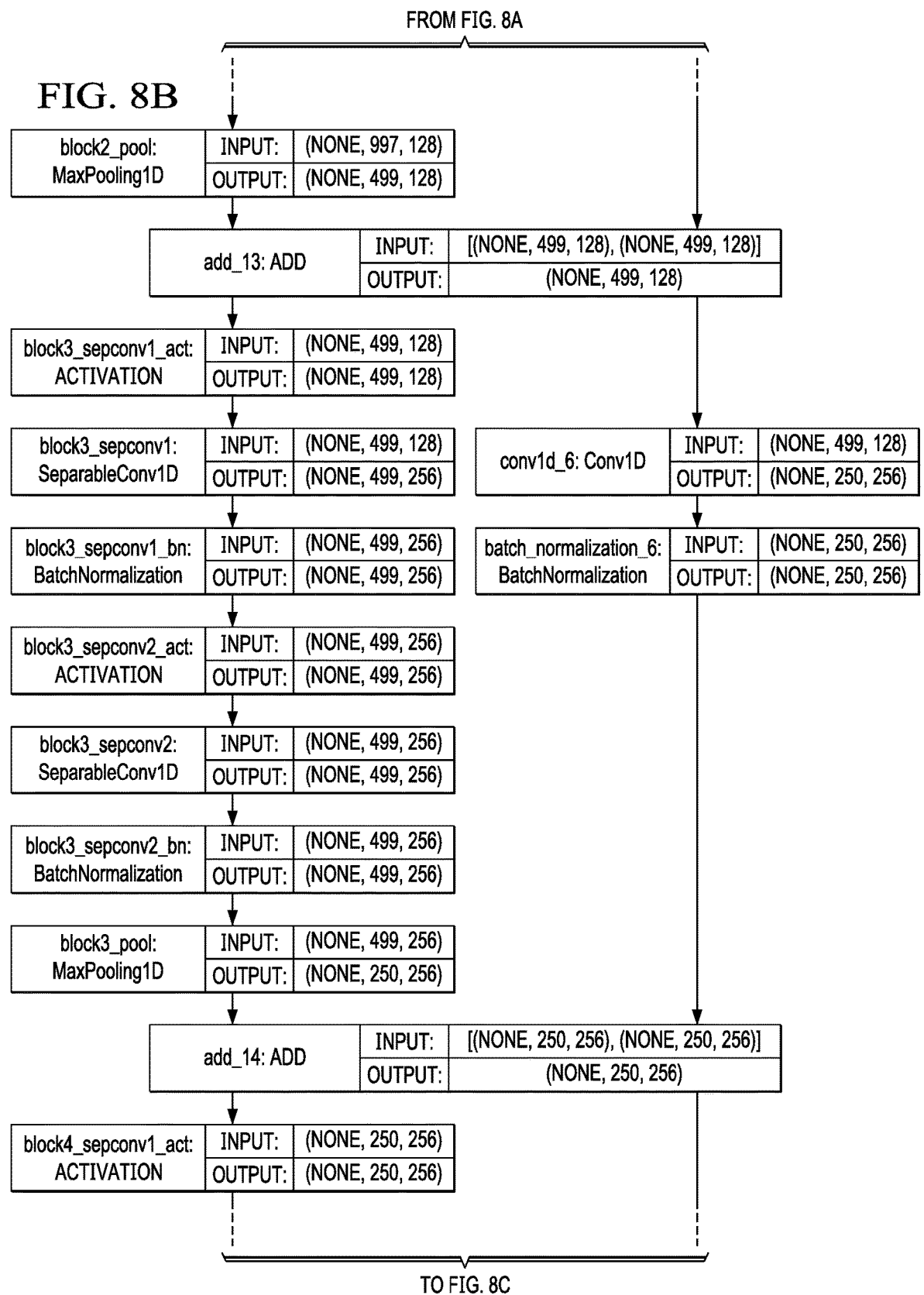
Figure 8C:
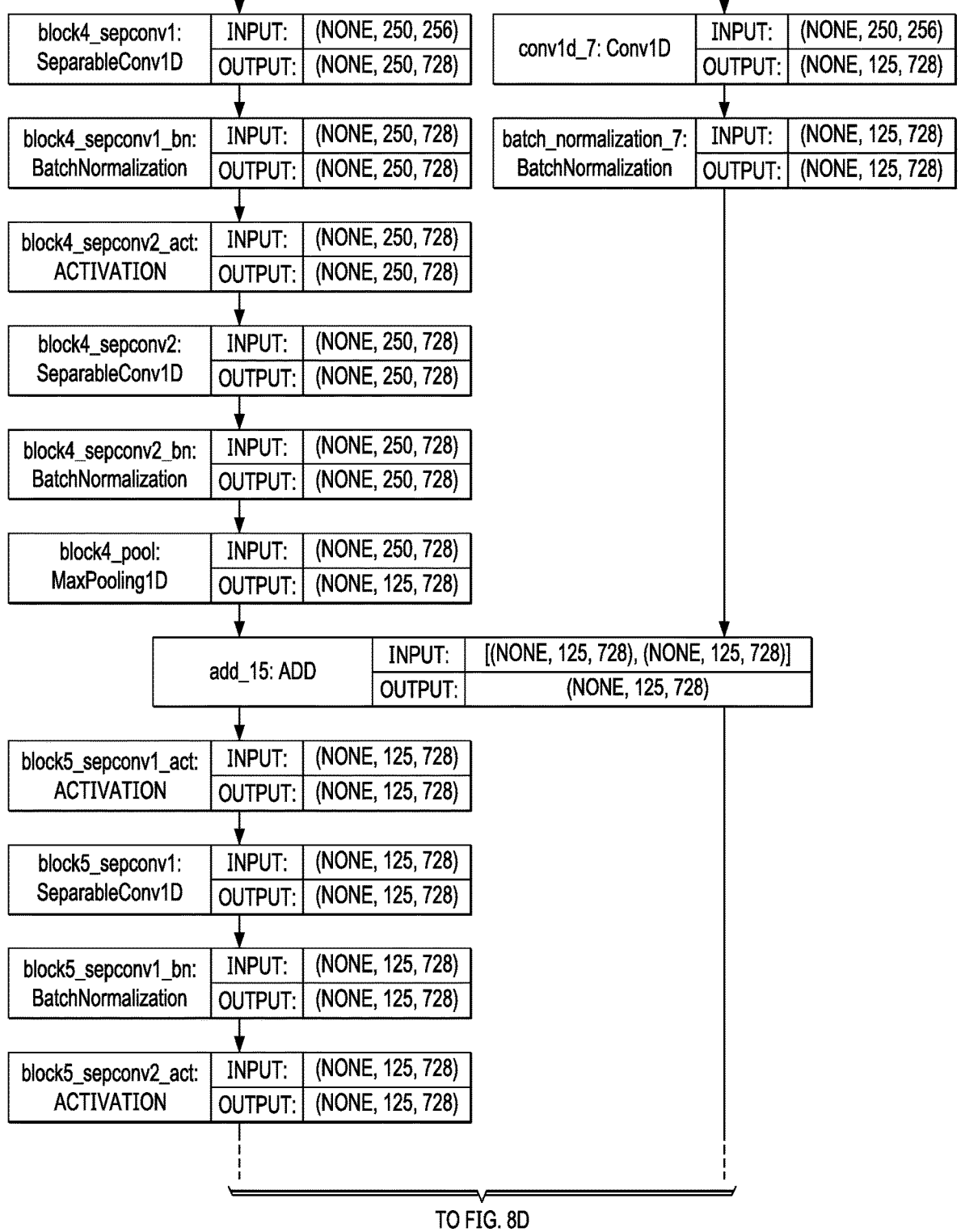
Figure 8D:
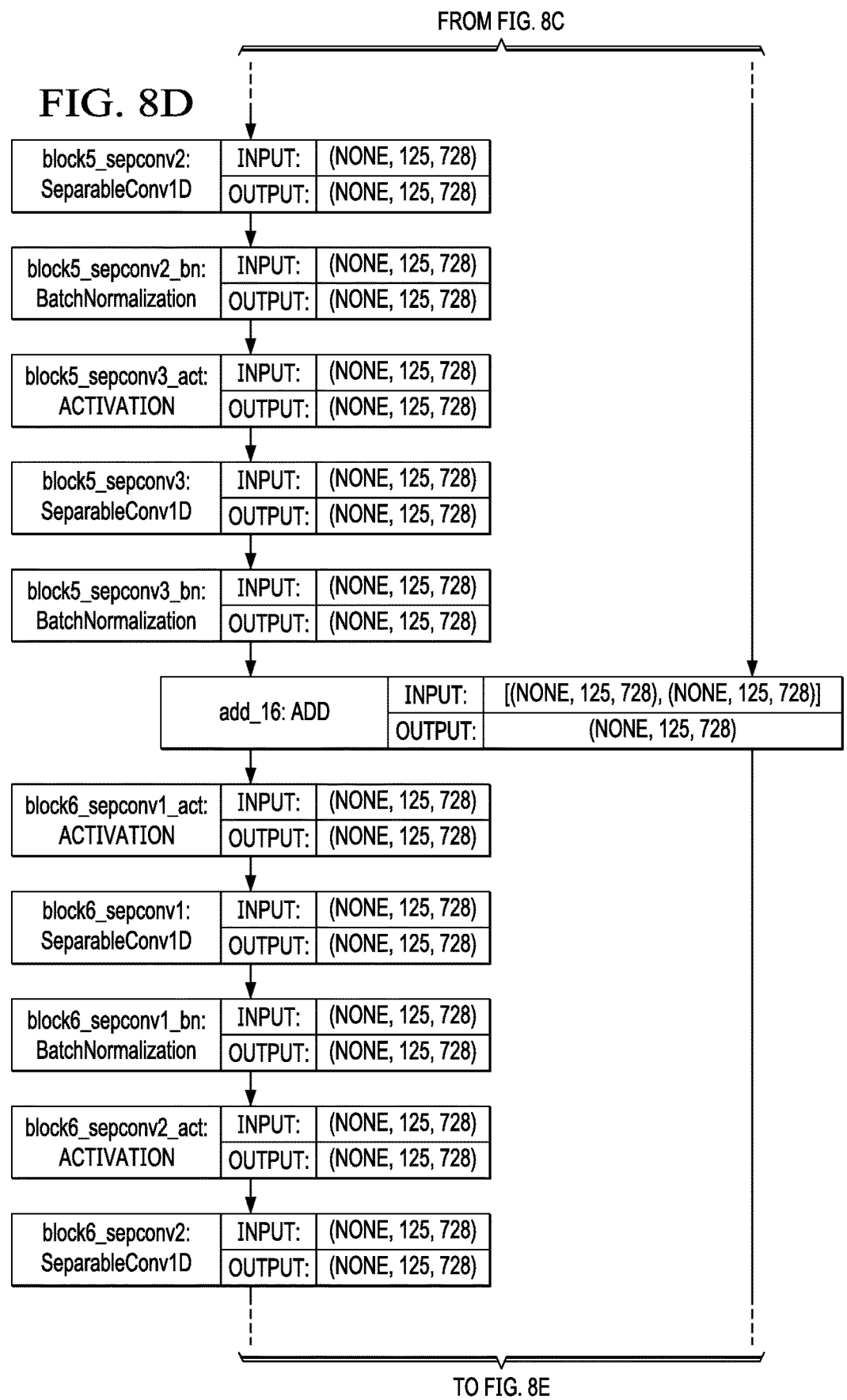
Figure 8E:
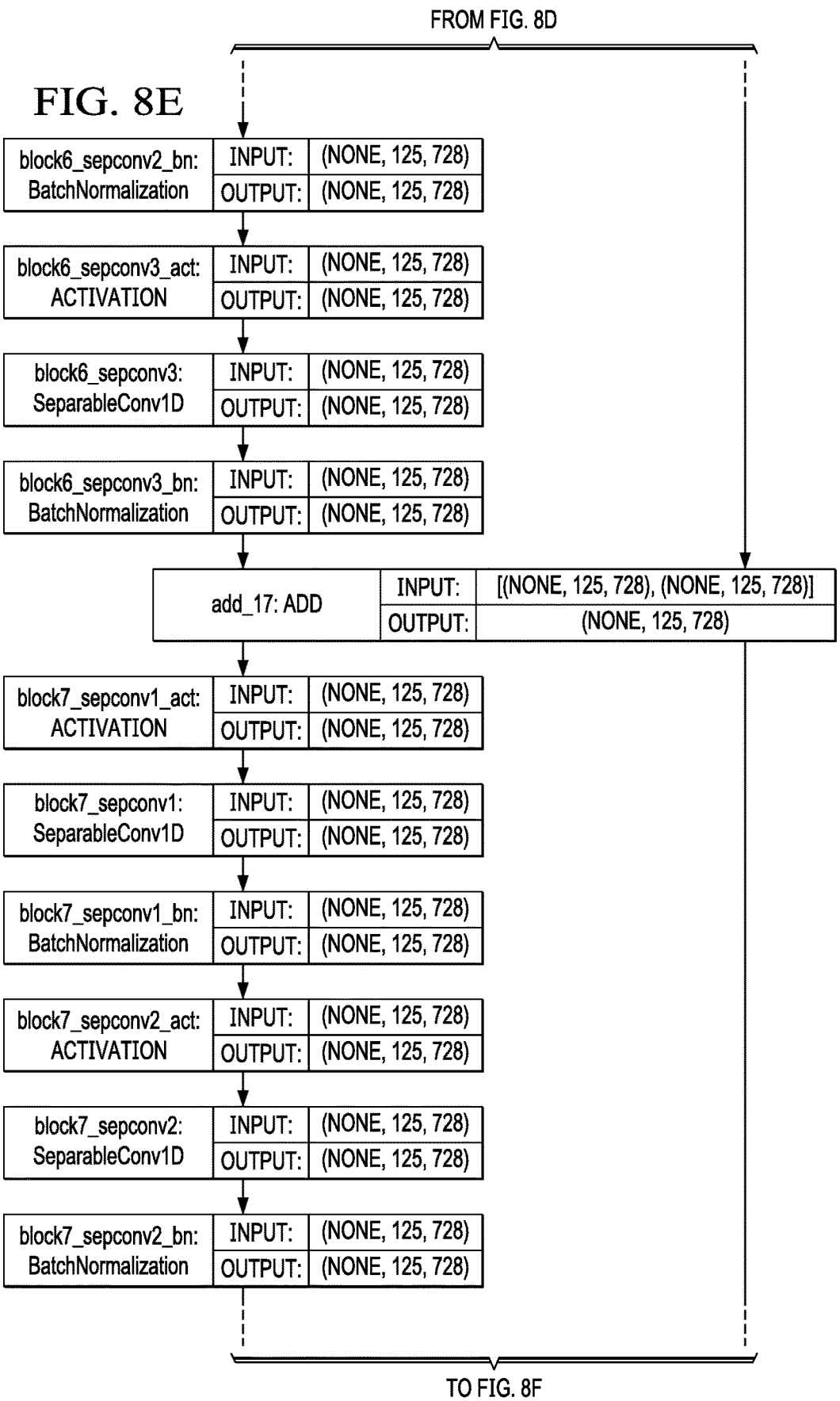
Figure 8F:
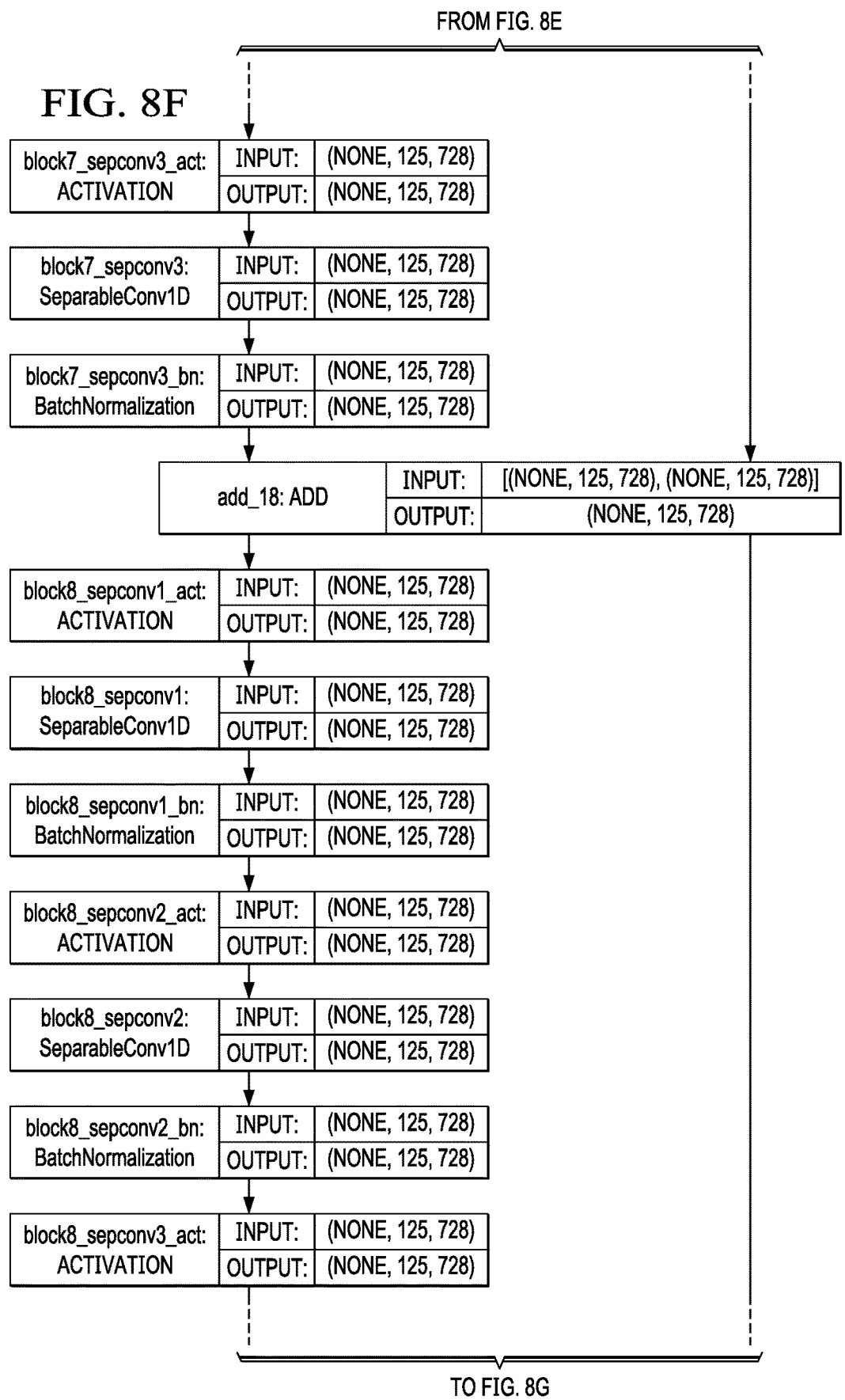
Figure 8H:
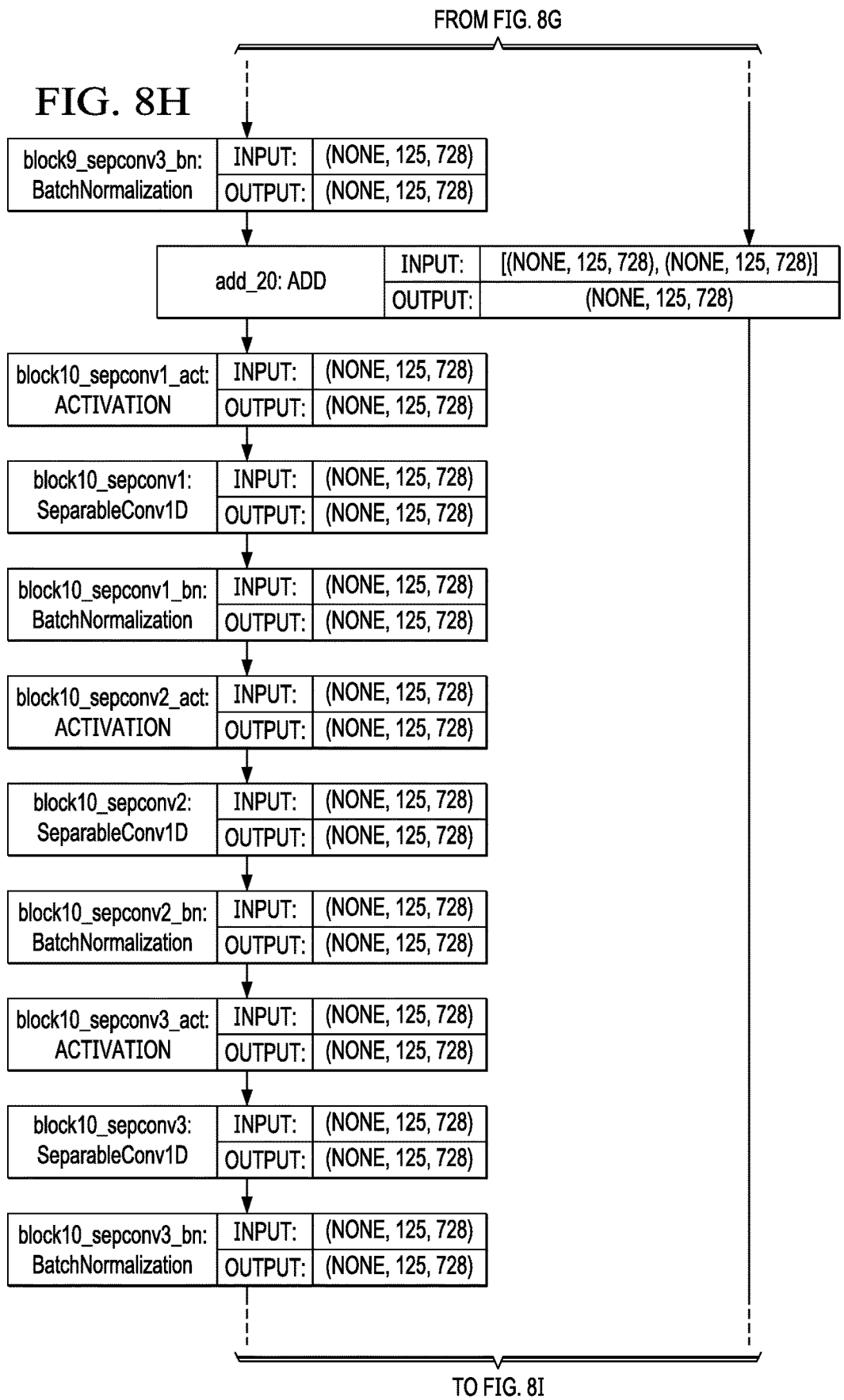
Figure 8I:
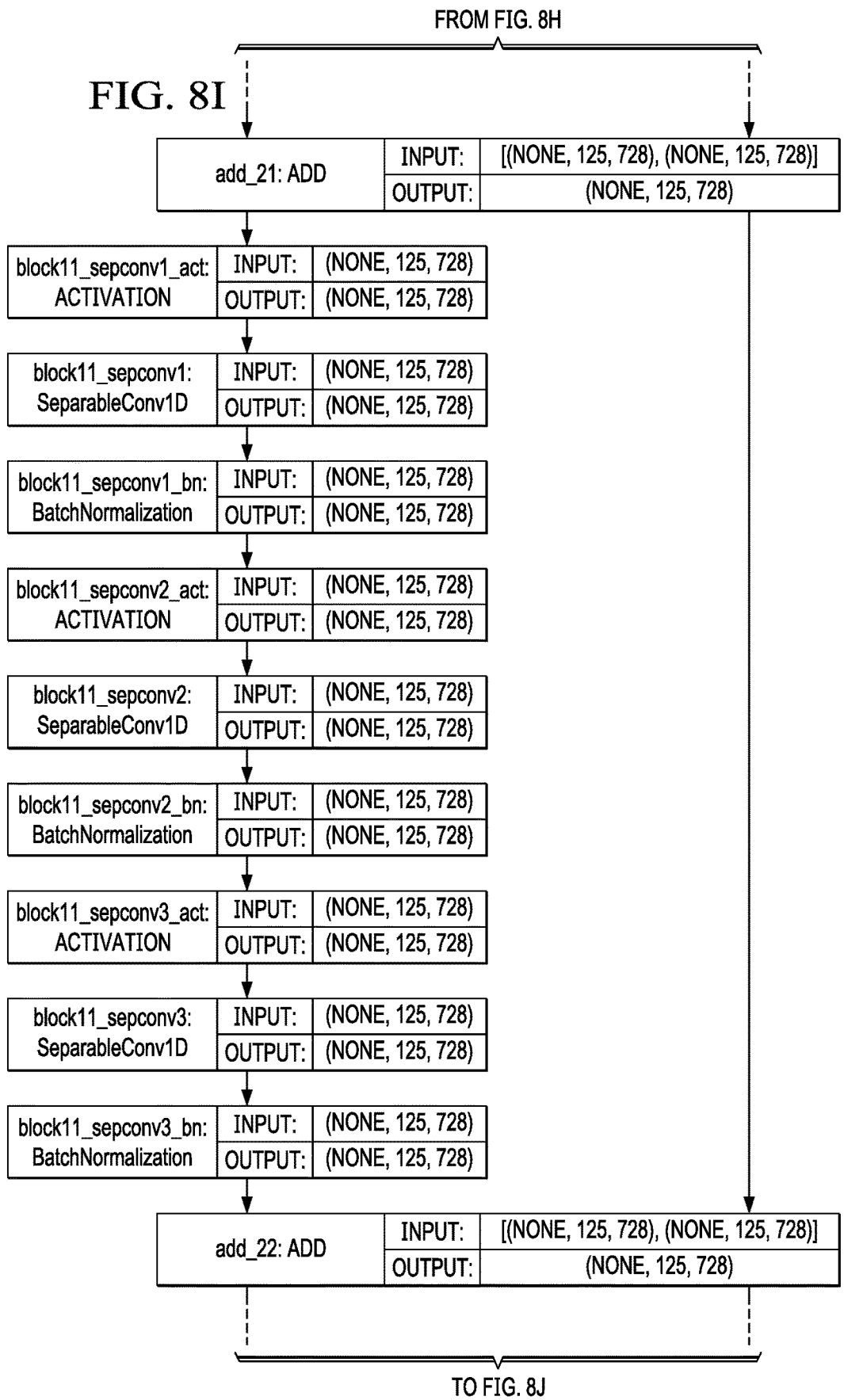
Figure 8J:
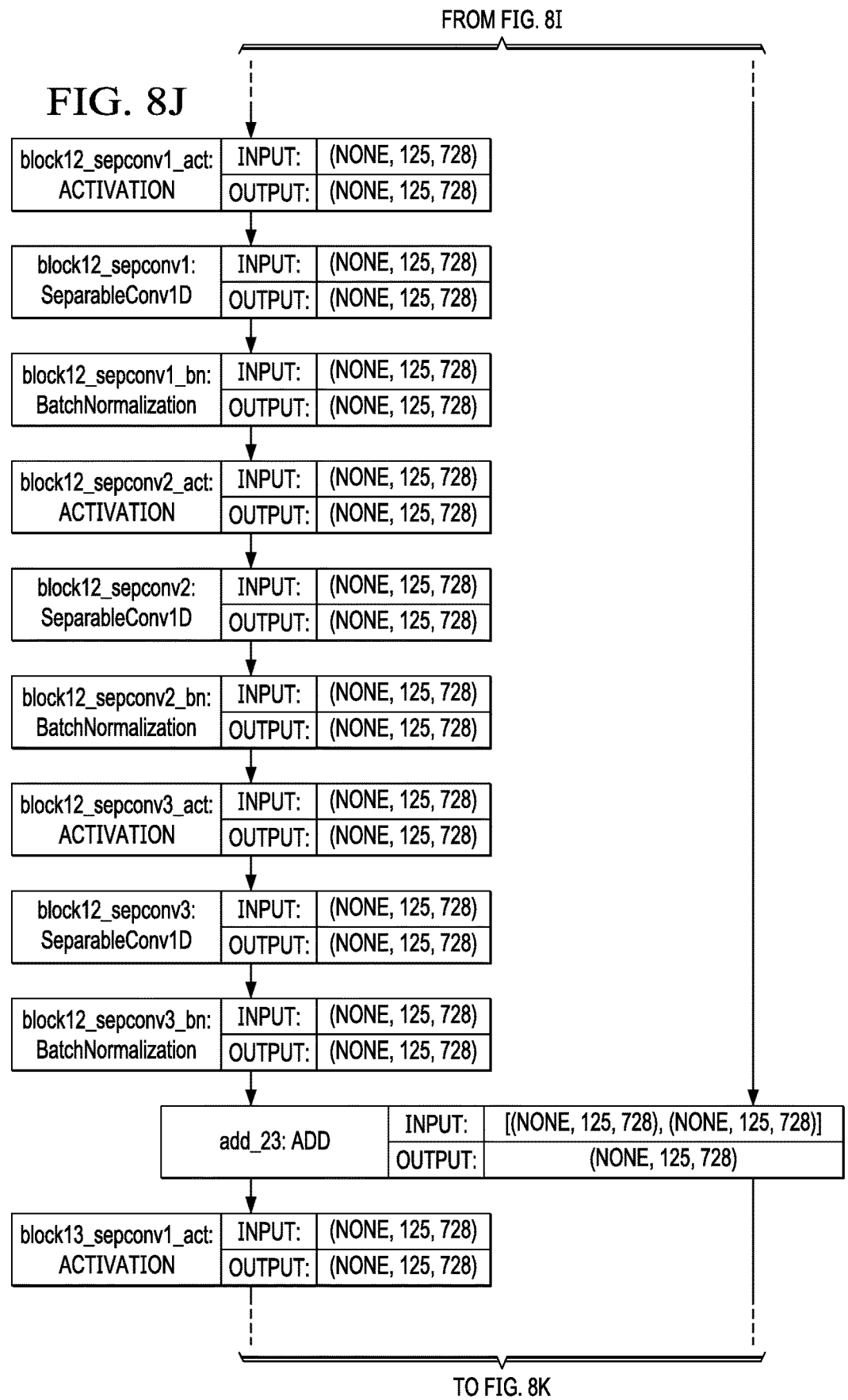
Figure 8K:
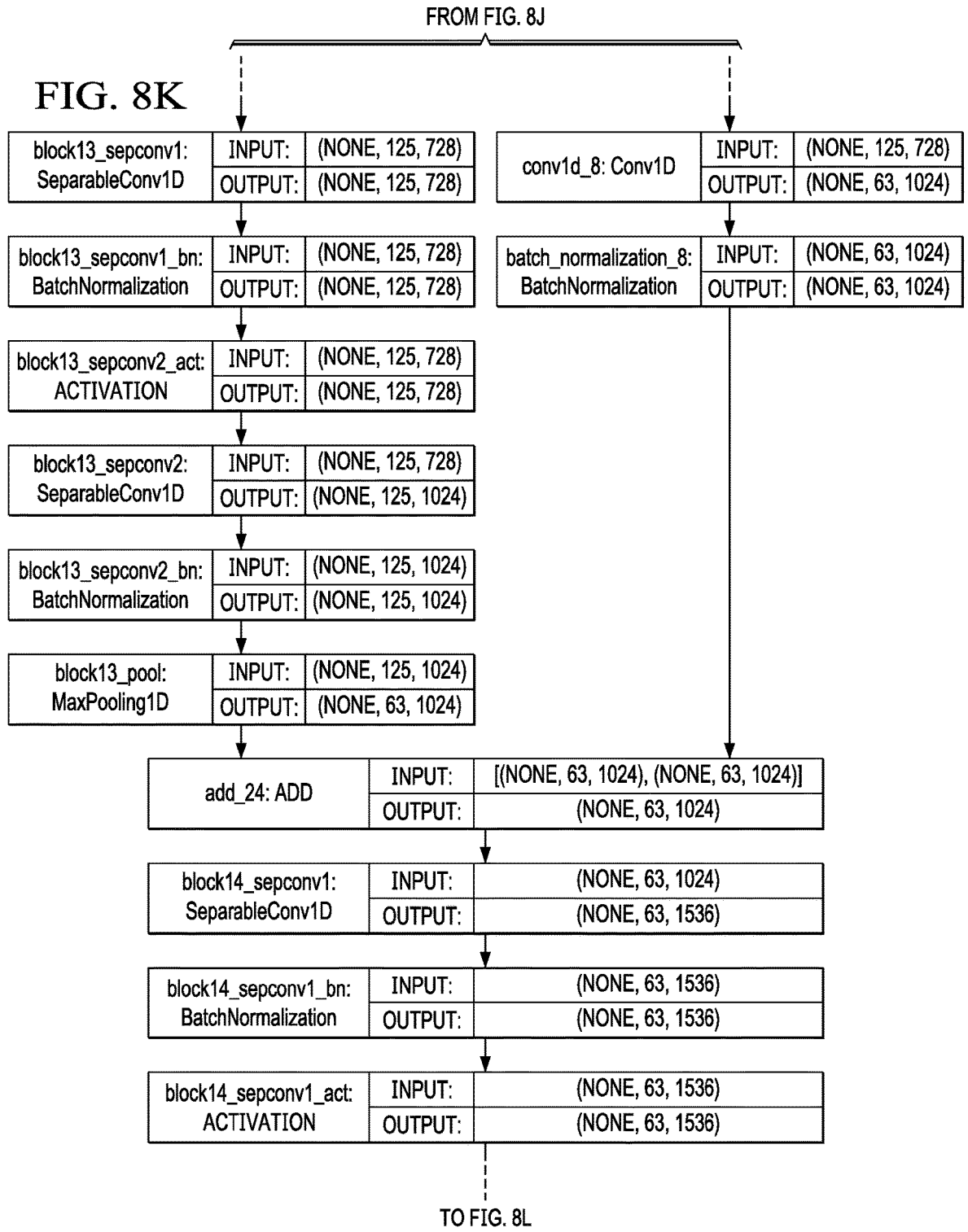
Figure 8L:
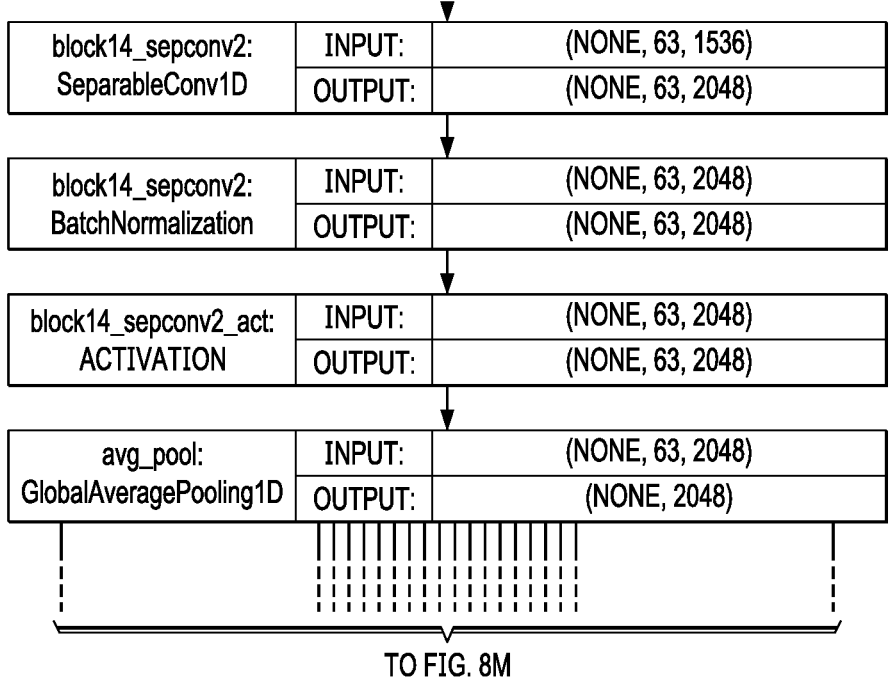
Figure 8N:
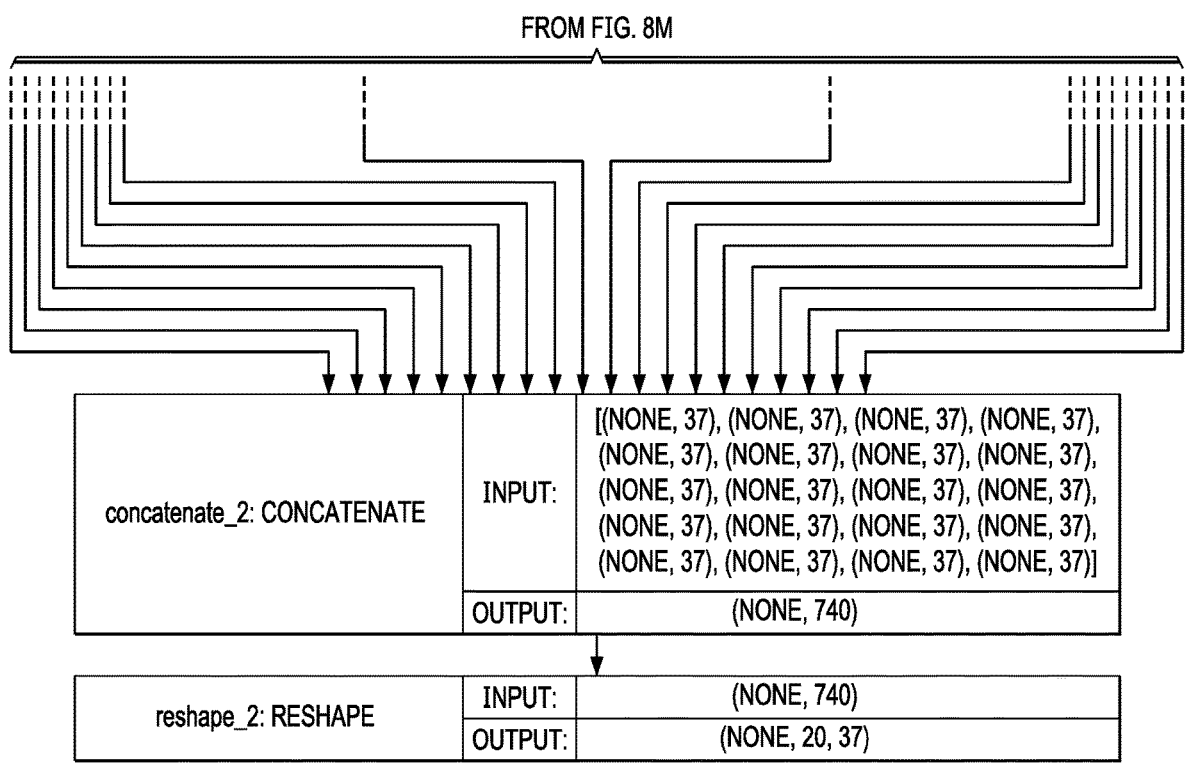
Figure 9A:
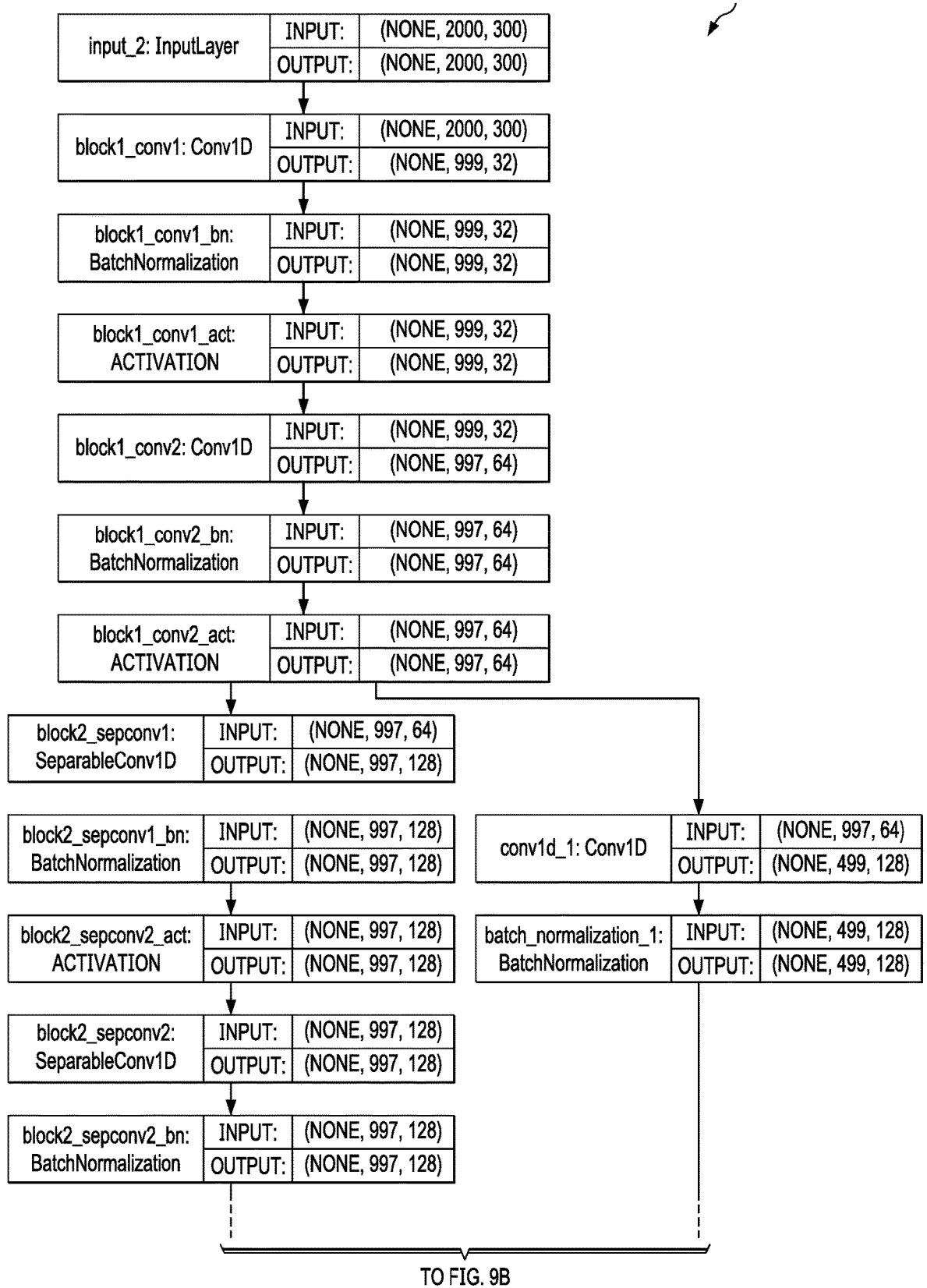
Figure 9B:
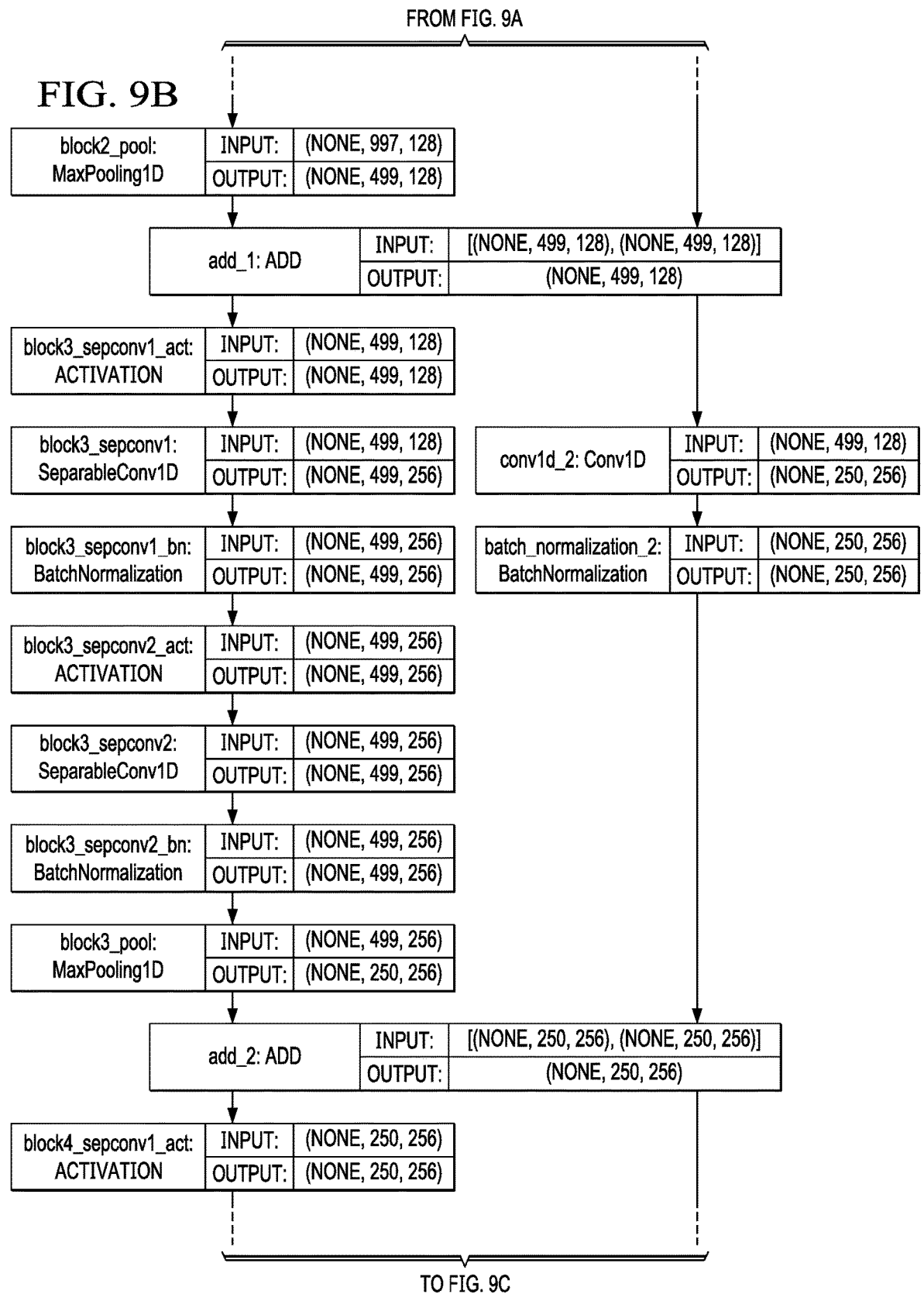
Figure 9D:
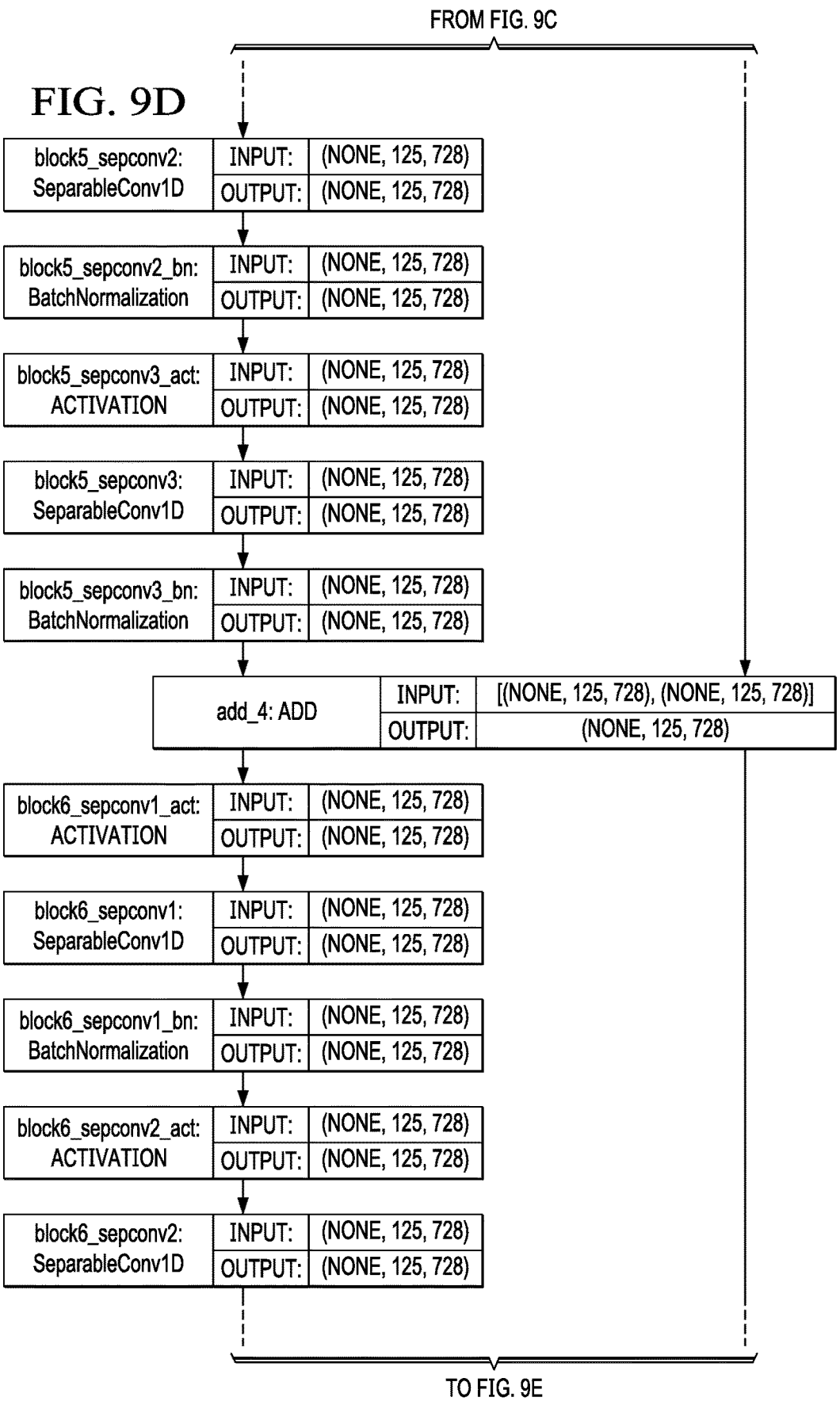
Figure 9E:
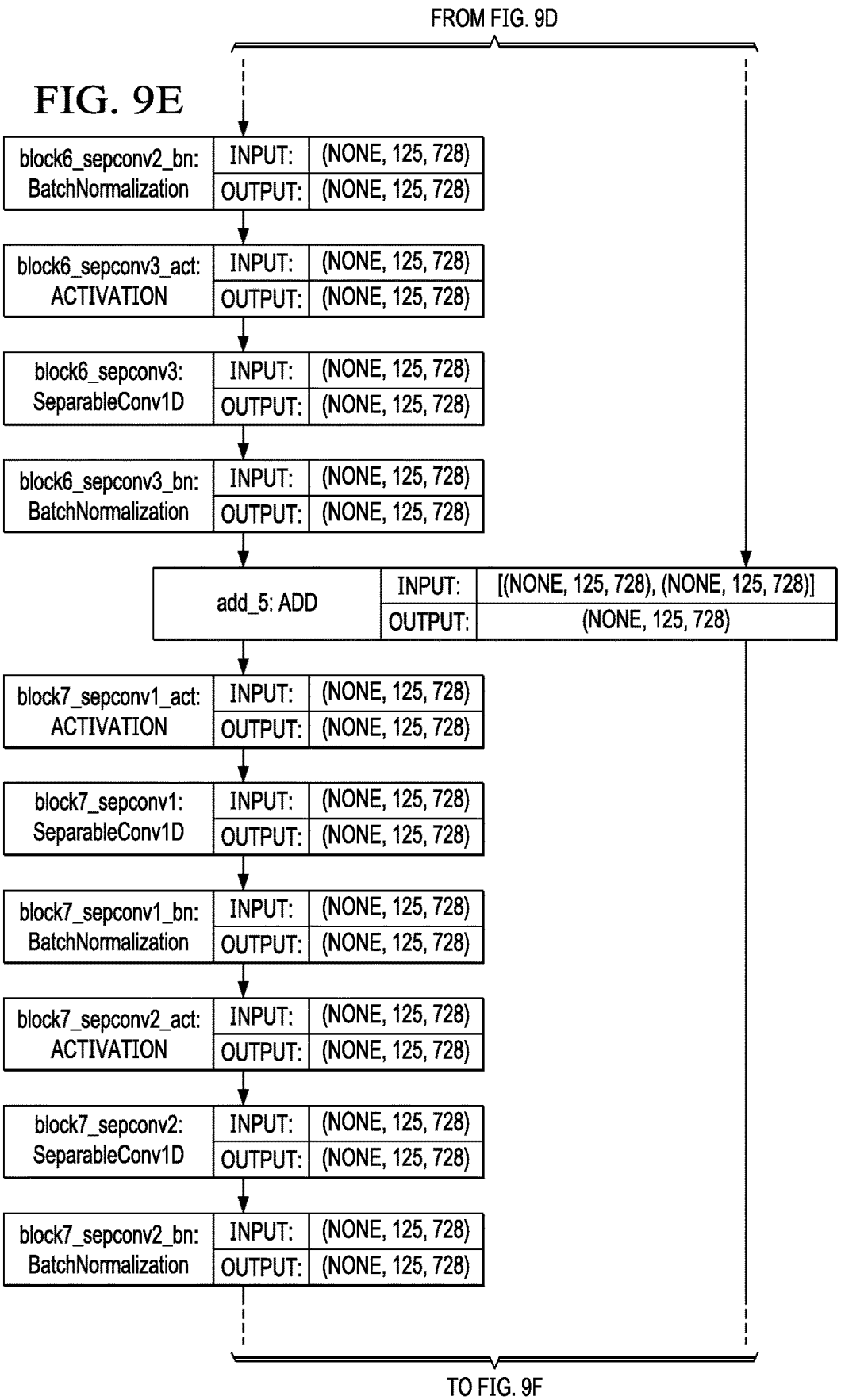
Figure 9F:
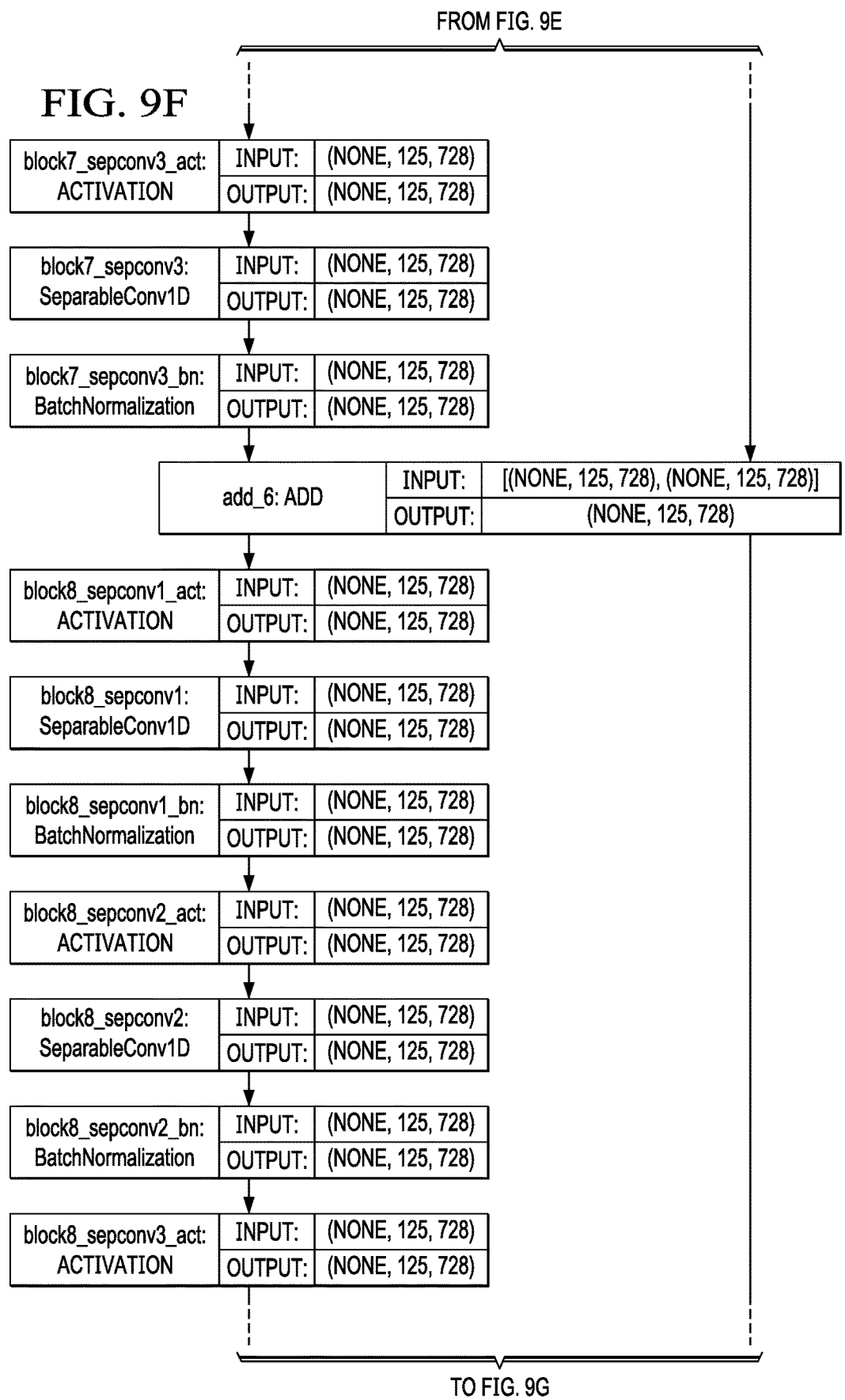
Figure 9G:
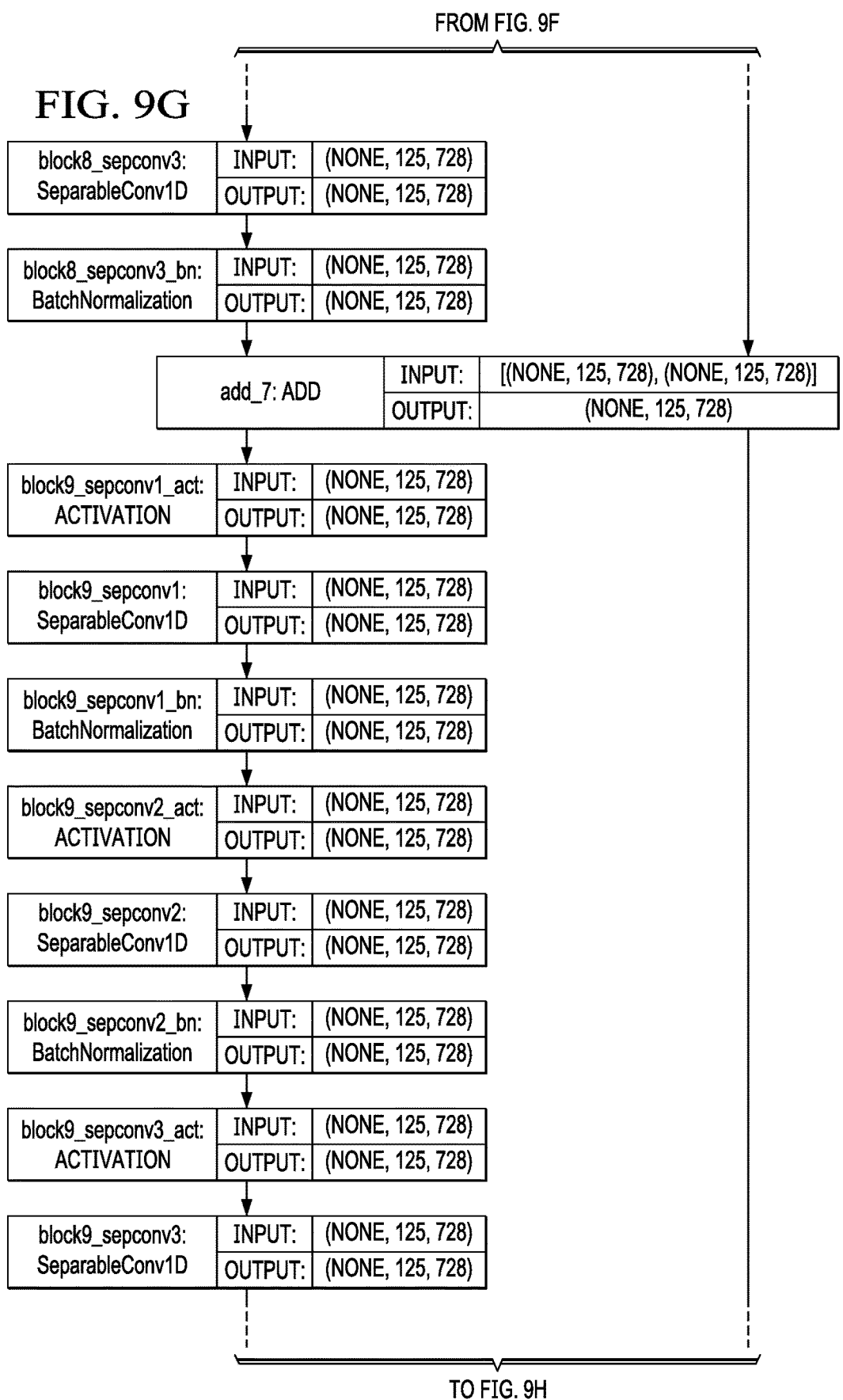
Figure 9I:
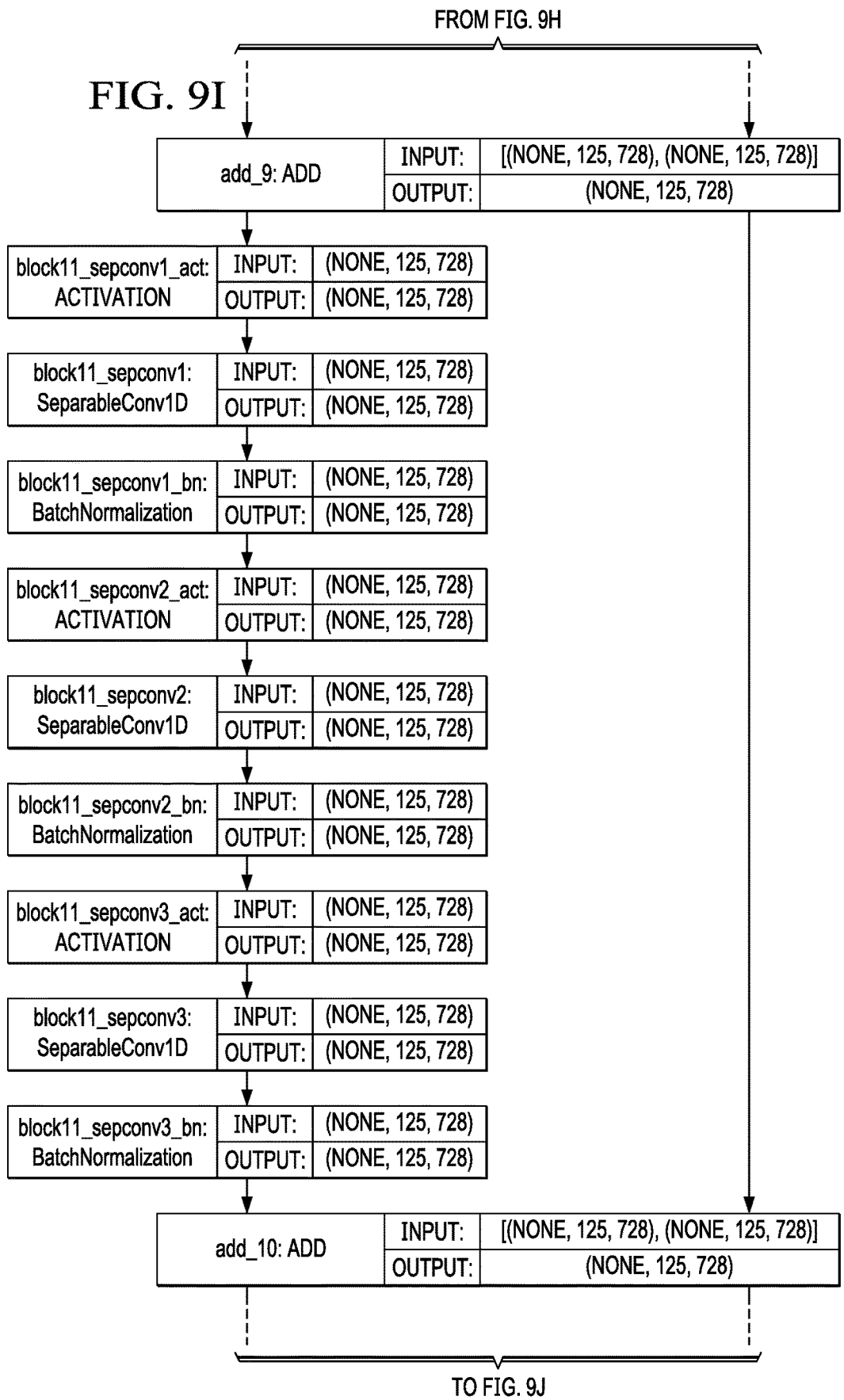
Figure 9J:
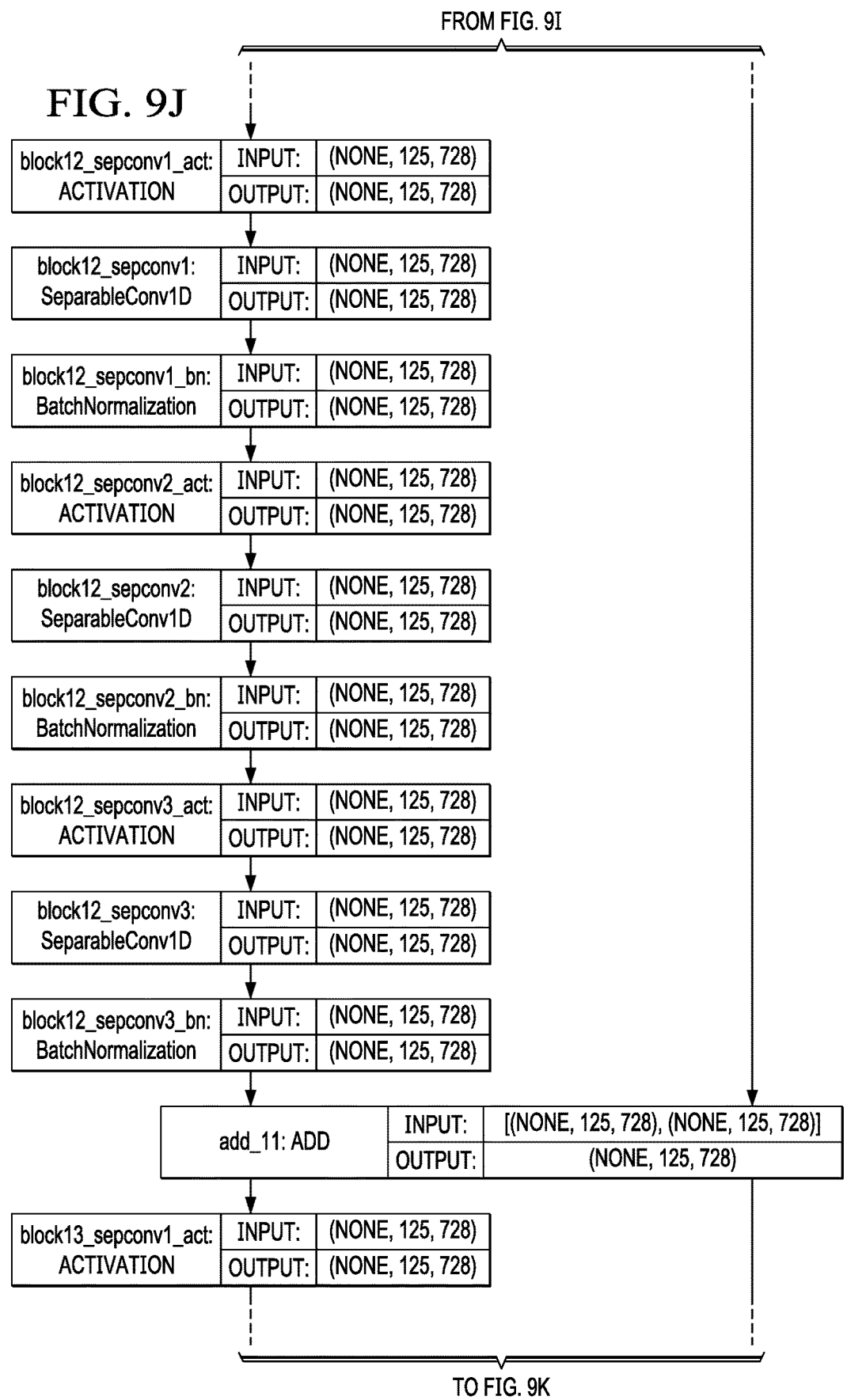
Figure 9K:
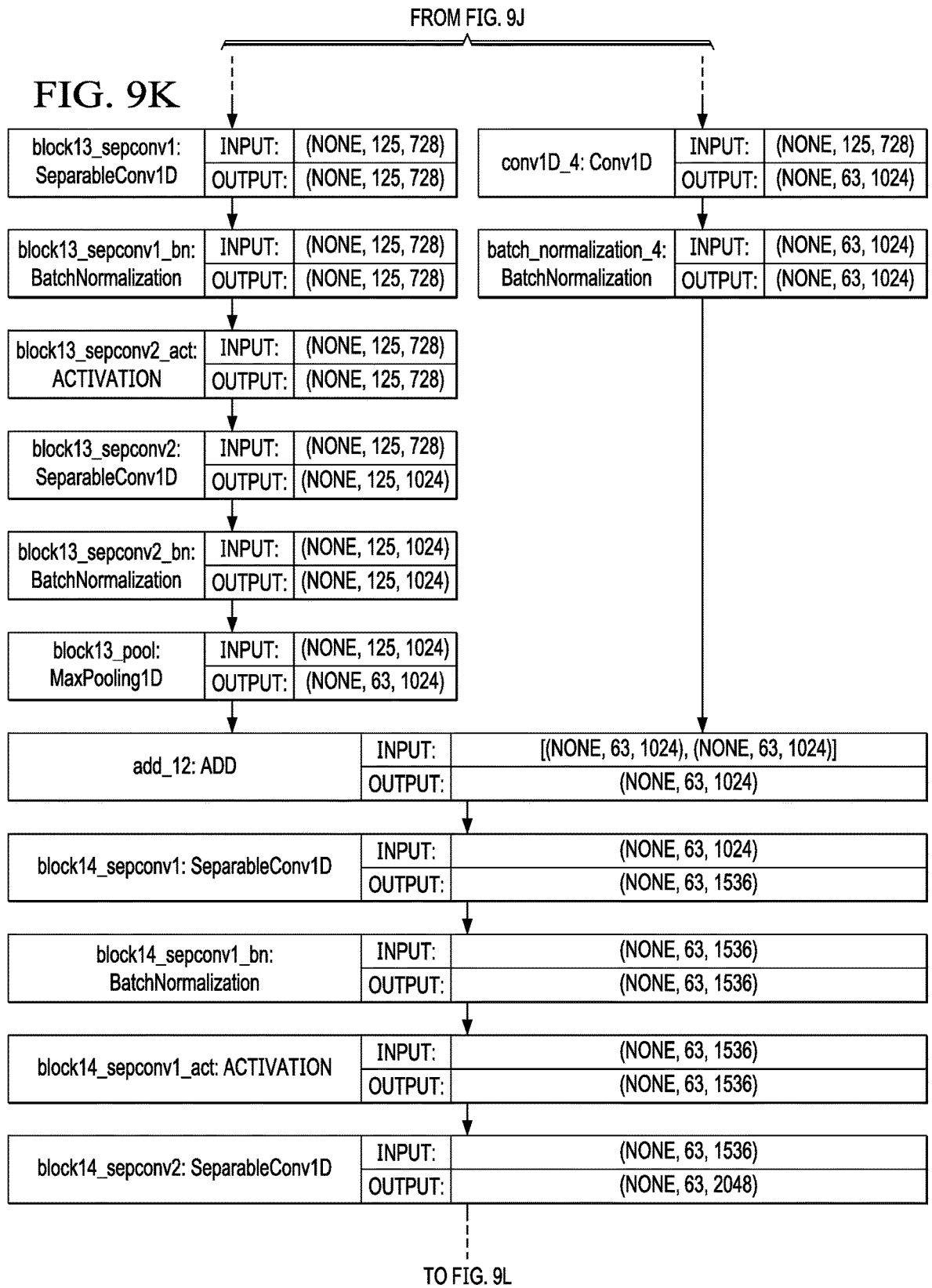
Figure 9L:
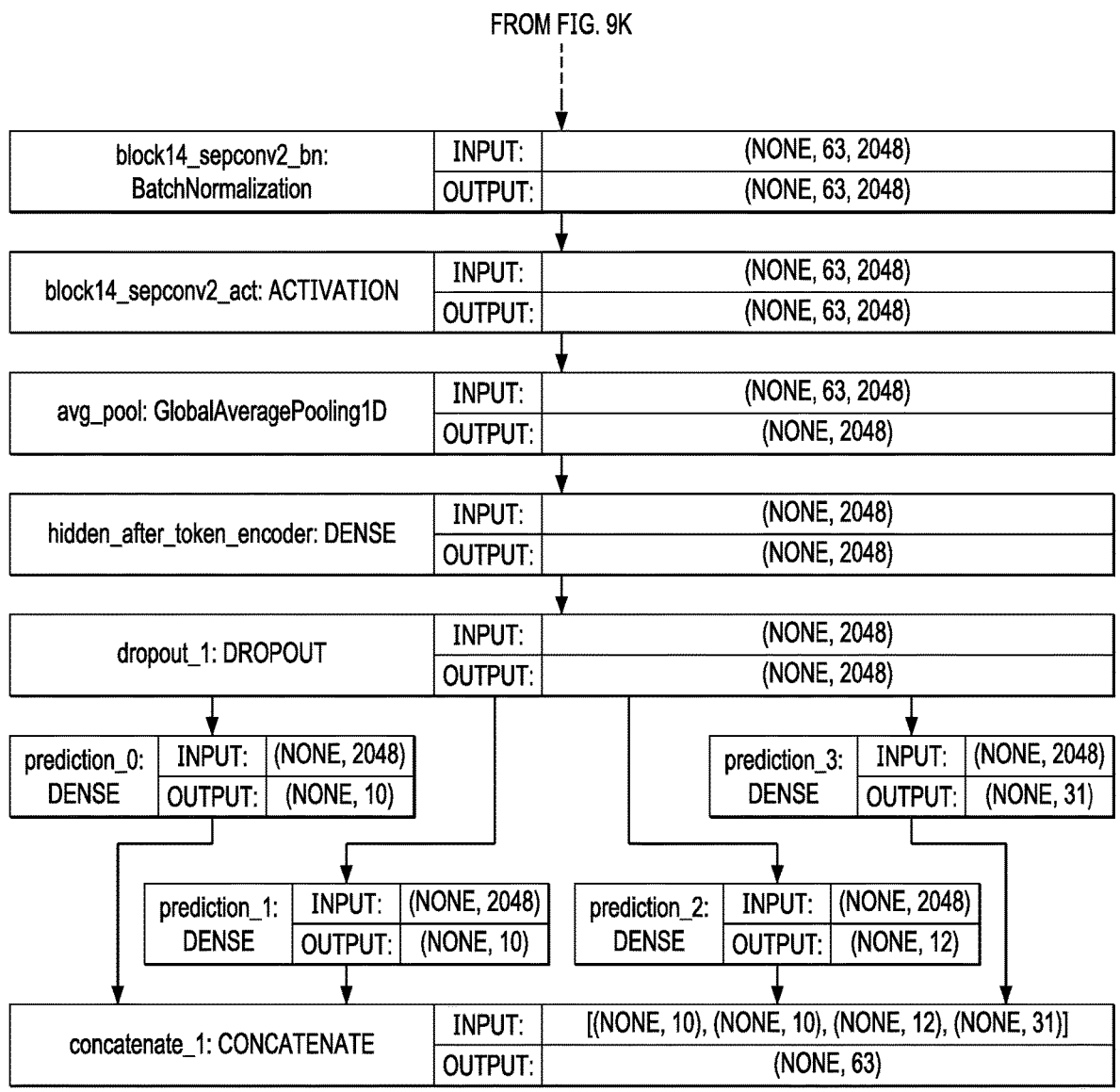

FIGS. 8A-8N show a use case diagram illustrating a method 800 for determining a sequence of classification according to method 500 in accordance with an illustrative embodiment.

FIGS. 9A-9L show a use case diagram illustrating a method 900 for determining a sequence of classification according to method 600 in accordance with an illustrative embodiment.

Illustrative embodiments provide the technical improvement of that no annotation of the full text is needed. Furthermore, training of the machine learning method for named entity extraction may be performed on a graphics processor unit (GPU) with an output of only one value with a corresponding possibility value.

Turning now to a discussion of machine learning which can be used to implement various embodiments of this disclosure, there are three main categories of machine learning: supervised, unsupervised, and reinforcement learning. Supervised machine learning comprises providing the machine with training data and the correct output value of the data. During supervised learning the values for the output are provided along with the training data (labeled dataset) for the model building process. The algorithm, through trial and error, deciphers the patterns that exist between the input training data and the known output values to create a model that can reproduce the same underlying rules with new data. Examples of supervised learning algorithms include regression analysis, decision trees, k-nearest neighbors, neural networks, and support vector machines.

If unsupervised learning is used, not all of the variables and data patterns are labeled, forcing the machine to discover hidden patterns and create labels on its own through the use of unsupervised learning algorithms. Unsupervised learning has the advantage of discovering patterns in the data with no need for labeled datasets. Examples of algorithms used in unsupervised machine learning include k-means clustering, association analysis, and descending clustering.

Whereas supervised and unsupervised methods learn from a dataset, reinforcement learning methods learn from interactions with an environment. Algorithms such as Q-learning are used to train the predictive model through interacting with the environment using measurable performance criteria.

Figure 10:
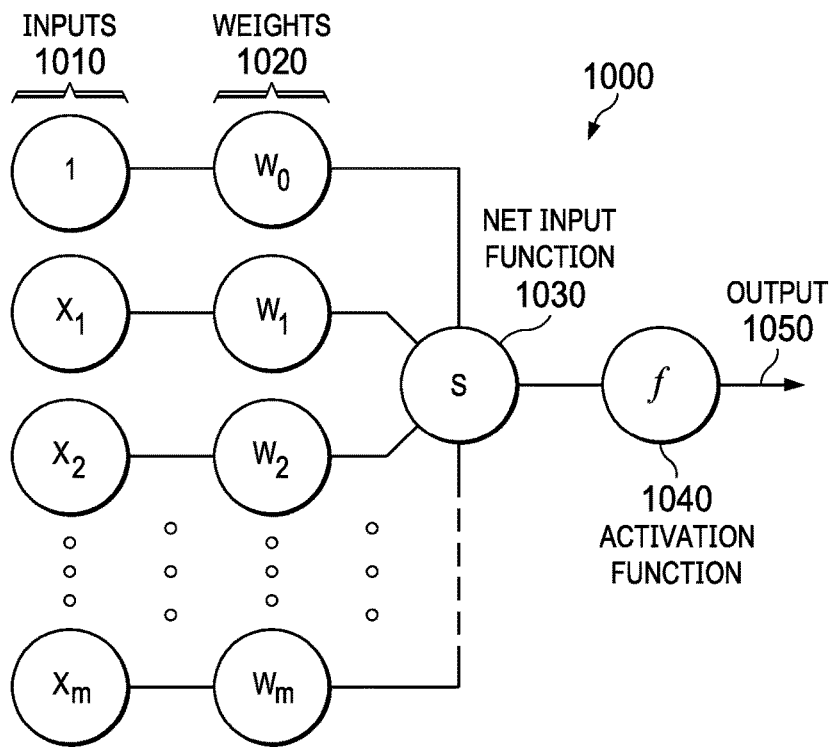
FIG. 10 is a diagram that illustrates a node in a neural network in which illustrative embodiments can be implemented.

FIG. 10 is a diagram that illustrates a node in a neural network in which illustrative embodiments can be implemented. Node 1000 combines multiple inputs 1010 from other nodes. Each input 1010 is multiplied by a respective weight 1020 that either amplifies or dampens that input, thereby assigning significance to each input for the task the algorithm is trying to learn. The weighted inputs are collected by a net input function 1030 and then passed through an activation function 1040 to determine the output 1050. The connections between nodes are called edges. The respective weights of nodes and edges might change as learning proceeds, increasing or decreasing the weight of the respective signals at an edge. A node might only send a signal if the aggregate input signal exceeds a predefined threshold. Pairing adjustable weights with input features is how significance is assigned to those features with regard to how the network classifies and clusters input data.

Neural networks are often aggregated into layers, with different layers performing different kinds of transformations on their respective inputs. A node layer is a row of nodes that turn on or off as input is fed through the network. Signals travel from the first (input) layer to the last (output) layer, passing through any layers in between. Each layer's output acts as the next layer's input.

Figure 11:
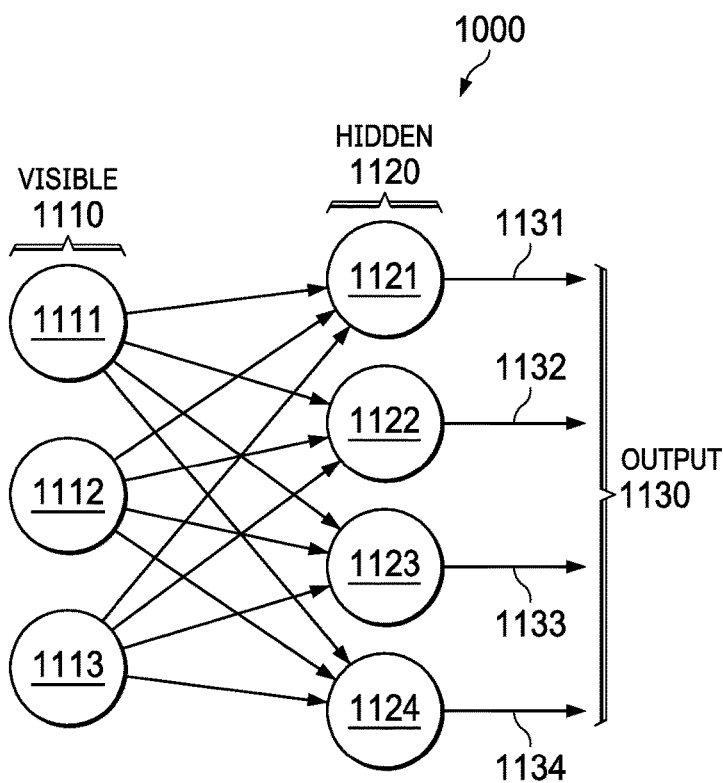
FIG. 11 is a diagram illustrating a restricted Boltzmann machine in which illustrative embodiments can be implemented.

FIG. 11 is a diagram illustrating a neural network in which illustrative embodiments can be implemented. As shown in FIG. 11, the nodes in the neural network 1100 are divided into a layer of visible nodes 1110 and a layer of hidden nodes 1120. The visible nodes 1110 are those that receive information from the environment (i.e. a set of external training data). Each visible node in layer 1110 takes a low-level feature from an item in the dataset and passes it to the hidden nodes in the next layer 1120. When a node in the hidden layer 1120 receives an input value x from a visible node in layer 1110 it multiplies x by the weight assigned to that connection (edge) and adds it to a bias b. The result of these two operations is then fed into an activation function which produces the node's output.

In symmetric networks, each node in one layer is connected to every node in the next layer. For example, when node 1121 receives input from all of the visible nodes 1111-13 each x value from the separate nodes is multiplied by its respective weight, and all of the products are summed. The summed products are then added to the hidden layer bias, and the result is passed through the activation function to produce output 1131. A similar process is repeated at hidden nodes 1122-24 to produce respective outputs 1132-34. In the case of a deeper neural network, the outputs 1130 of hidden layer 1120 serve as inputs to the next hidden layer.

Training a neural network occurs in two alternating phases. The first phase is the "positive" phase in which the visible nodes' states are clamped to a particular binary state vector sampled from the training set (i.e. the network observes the training data). The second phase is the "negative" phase in which none of the nodes have their state determined by external data, and the network is allowed to run freely (i.e. the network tries to reconstruct the input). In the negative reconstruction phase the activations of the hidden layer 1120 act as the inputs in a backward pass to visible layer 1110. The activations are multiplied by the same weights that the visible layer inputs were on the forward pass. At each visible node 1111-13 the sum of those products is added to a visible-layer bias. The output of those operations is a reconstruction r (i.e. an approximation of the original input x).

In machine learning, a cost function estimates how the model is performing. It is a measure of how wrong the model is in terms of its ability to estimate the relationship between input x and output y. This is expressed as a difference or distance between the predicted value and the actual value. The cost function (i.e. loss or error) can be estimated by iteratively running the model to compare estimated predictions against known values of y during supervised learning. The objective of a machine learning model, therefore, is to find parameters, weights, or a structure that minimizes the cost function.

Gradient descent is an optimization algorithm that attempts to find a local or global minima of a function, thereby enabling the model to learn the gradient or direction that the model should take in order to reduce errors. As the model iterates, it gradually converges towards a minimum where further tweaks to the parameters produce little or zero changes in the loss. At this point the model has optimized the weights such that they minimize the cost function.

Neural networks can be stacked to created deep networks. After training one neural net, the activities of its hidden nodes can be used as training data for a higher level, thereby allowing stacking of neural networks. Such stacking makes it possible to efficiently train several layers of hidden nodes. Examples of stacked networks include deep belief networks (DBN), deep Boltzmann machines (DBM), convolutional neural networks (CNN), recurrent neural networks (RNN), and spiking neural networks (SNN).

Figure 12:
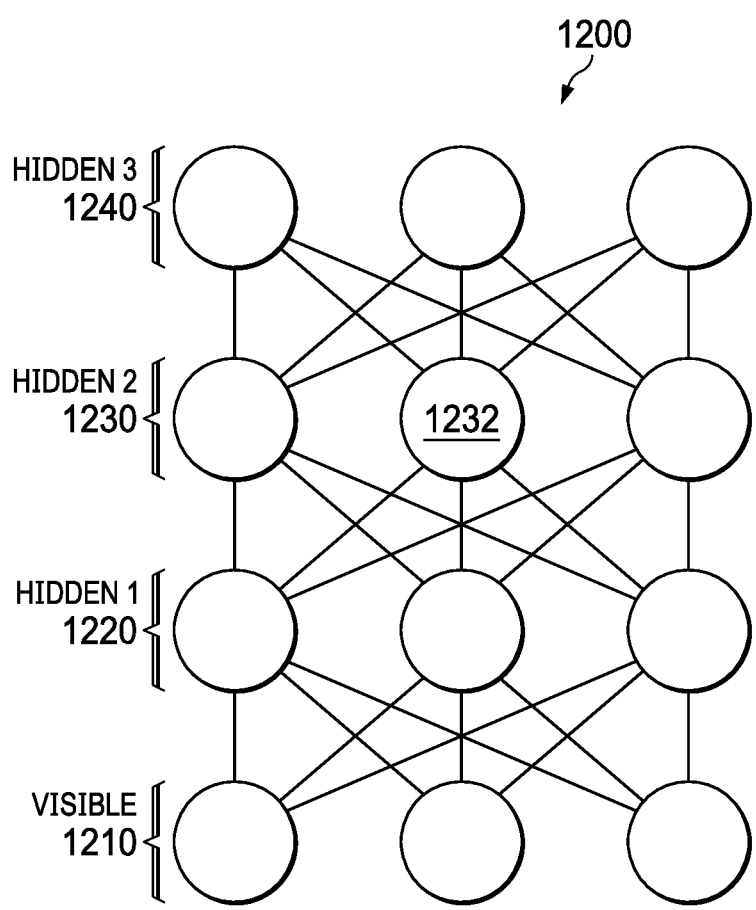
FIG. 12 is a block diagram illustrating a wage garnishment system in accordance with an illustrative embodiment.

FIG. 12 is a diagram illustrating a deep neural network in which illustrative embodiments can be implemented. A deep neural network 1200 comprises a layer of visible nodes 1210 and multiple layers of hidden nodes 1220-40. It should be understood that the number of nodes and layers depicted in FIG. 12 is chosen merely for ease of illustration and that the present disclosure can be implemented using more or less nodes and layers that those shown.

DNNs learn the hierarchical structure of features, wherein each subsequent layer in the DNN processes more complex features than the layer below it. For example, in FIG. 12, the first hidden layer 1220 might process low-level features, such as, e.g., the edges of an image. The next hidden layer up 1230 would process higher-level features, e.g., combinations of edges, and so on. This process continues up the layers, learning simpler representations and then composing more complex ones.

In bottom-up sequential learning, the weights are adjusted at each new hidden layer until that layer is able to approximate the input from the previous lower layer. Alternatively, undirected architecture allows the joint optimization of all levels, rather than sequentially up the layers of the stack.

Another type of neural network that more closely simulates the functioning of biological systems is a Spiking Neural Network (SNN). SNNs incorporate the concept of time into their operating model. One of the most important differences between SNNs and other types of neural networks is the way information propagates between units/nodes.

Whereas other types of neural networks communicate using continuous activation values, communication in SNNs is done by broadcasting trains of action potentials, known as spike trains. In biological systems, a spike is generated when the sum of changes in a neuron's membrane potential resulting from pre-synaptic stimulation crosses a threshold. This principle is simulated in artificial SNNs in the form of a signal accumulator that fires when a certain type of input surpasses a threshold. The intermittent occurrence of spikes gives SNNs the advantage of much lower energy consumption than other types of neural networks. A synapse can be either excitatory (i.e. increases membrane potential) or inhibitory (i.e. decreases membrane potential). The strength of the synapses (weights) can be changed as a result of learning.

Information in SNNs is conveyed by spike timing, including latencies and spike rates. SNNs allow learning (weight modification) that depends on the relative timing of spikes between pairs of directly connected nodes. Under the learning rule known as spike-timing-dependent plasticity (STDP) the weight connecting pre- and post-synaptic units is adjusted according to their relative spike times within a specified time interval. If a pre-synaptic unit fires before the post-synaptic unit within the specified time interval, the weight connecting them is increased (long-term potentiation (LTP)). If it fires after the post-synaptic unit within the time interval, the weight is decreased (long-term depression (LTD)).

The leaky integrate-and-fire (LIF) neuron has been a primary area of interest for the development of an artificial neuron and is a modified version of the original integrate-and-fire circuit. The LIF neuron is based on the biological neuron, which exhibits the following functionalities:

1) Integration: Accumulation of a series of input spikes,
2) Leaking: Leaking of the accumulated signal over time when no input is provided, and
3) Firing: Emission of an output spike when the accumulated signal reaches a certain level after a series of integration and leaking.

An LIF neuron continually integrates the energy provided by inputs until a threshold is reached and the neuron fires as a spike that provides input to other neurons via synapse connections. By emitting this spike, the neuron is returned to a low energy state and continues to integrate input current until its next firing. Throughout this process, the energy stored in the neuron continually leaks. If insufficient input is provided within a specified time frame, the neuron gradually reverts to a low energy state. This prevents the neuron from indefinitely retaining energy, which would not match the behavior of biological neurons.

Lateral inhibition is a process that allows an excited neuron to inhibit, or reduce, the activity of other nearby or connected neurons. One such neural computing system that seeks to take advantage of this is the winner-take-all system. As a form of competitive learning, artificial neurons contend for activation, meaning that only one neuron is chosen as the winner and allowed to fire, using lateral inhibition to suppress the output of all other neurons. After the winning neuron fires, the system is reset and the neurons once again compete for activation. A winner-take-all system is one of the many machine learning paradigms that take advantage of the lateral inhibition phenomenon, which is commonly used in recognition and modeling processes.

Figure 13:
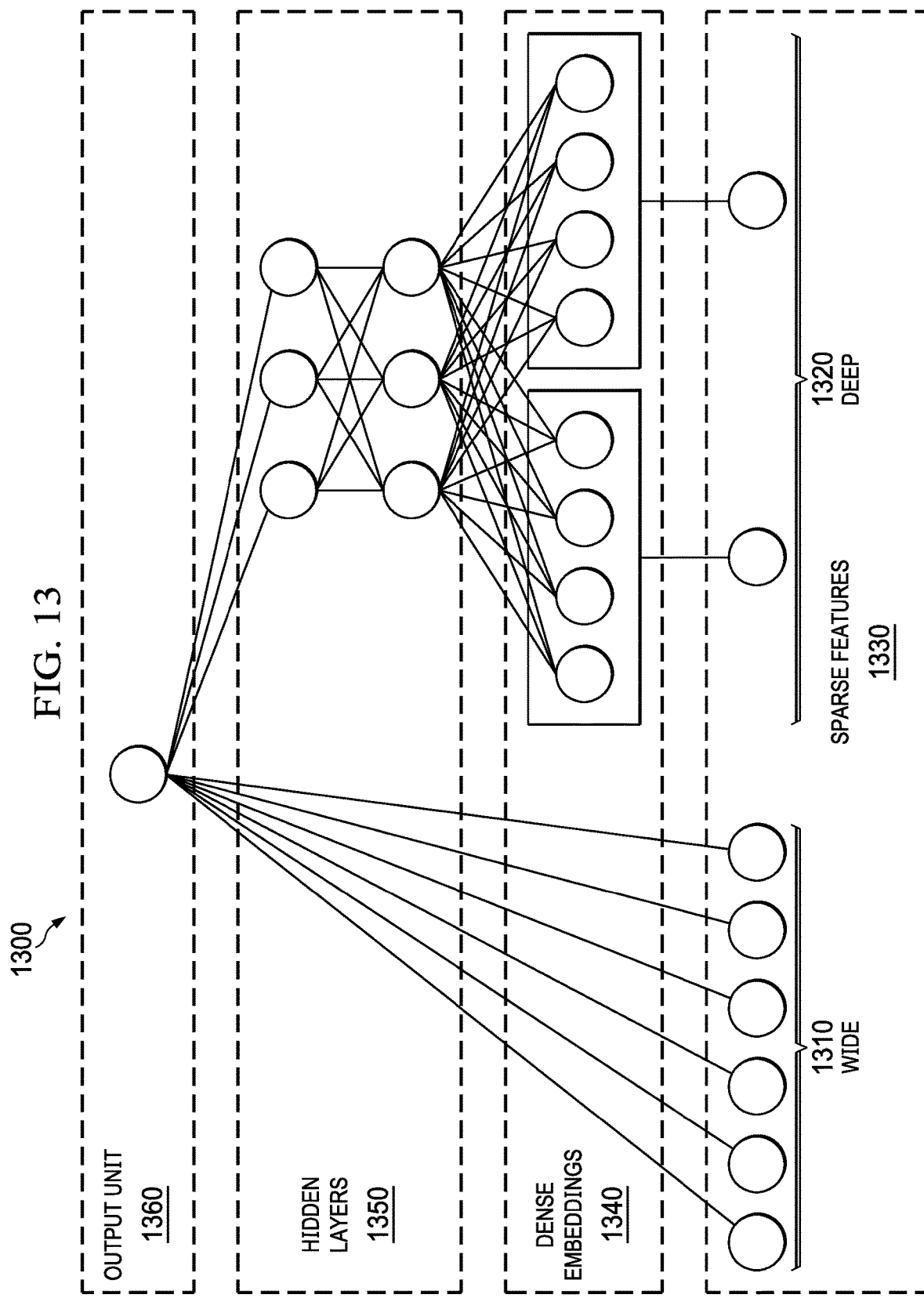
FIG. 13 is a diagram illustrating a wide-and-deep neural network in which illustrative embodiments can be implemented.

FIG. 13 is a diagram illustrating a wide-and-deep neural network in which illustrative embodiments can be implemented. Wide-and-deep model 1300 comprises two main parts, a wide linear part 1310 and a deep part 1320. Wide part 1310 is responsible for learning and memorizing the co-occurrence of particular dimensions within a data set. Deep part 1320 learns complex relationships among individual dimensions in the data set. Stated more simply, deep part 1320 develops general rules about the data set, and wide part 1310 memorizes exceptions to those rules.

Wide-and-deep model 1300 comprises a plurality of layers. The first two layers comprise sparse features 1330 and dense embeddings 1340. Features refer to properties of a phenomenon being modelled that are considered to have some predictive quality. Sparse features 1330 comprise features with mostly zero values. Sparse feature vectors represent specific instantiations of general features can could have thousands or even millions of possible values, hence why most of the values in the vector are zeros. For example, a vocabulary might have a vast number of words, and each word is represented by a large vector comprised mostly of zero values. For a given word, the number of dimensions in the vector equals the number of words in the vocabulary, and the dimension representing the word within the vocabulary has a value of 1, and the remaining dimensions (representing the other words) have a value of zero.

The wide part 1310 of the wide-and-deep model 1300 learns using these sparse features 1330, which is why it is able to remember specific instances and exceptions.

Dense embeddings 1340, in contrast, comprise mostly non-zero values. An embedding is a dense, relatively low-dimensional vector space into which high-dimension sparse vectors can be translated. Embedding making machine learning easier to do on large inputs like sparse vectors representing words. In a dense embedding, words are represented by dense vectors, wherein the vector represents the projection of the word into a continuous vector space. Individual dimensions in these vectors typically have no inherent meaning, but rather it is the pattern of location and distance between vectors that machine learning uses. The position of a word within the vector space is learned from context and is based on the words that surround it when used.

Ideally, dense embeddings capture semantics of the input by placing semantically similar inputs close together in the embedding space. It is from these semantics that the deep part of 1320 of the wide-and-deep model 1300 is able to generalize rules about the input values. The deep embeddings 1340 mapped from the spare features 1310 serves as inputs to the hidden layers 1350 of the deep part 1320.

Left to itself, the wide part 1310 would overfit predictions by learning the specific instances represented in the sparse features 1330. Conversely, by itself the deep part 1320 would over generalize from the dense embeddings 1340, producing rules that are over or under inclusive in their predictions. Therefore, the wide-and-deep model 1300 trains both parts concurrently by feeding them both into a common output unit 1360. During learning, the value of output unit 1360 is back propagated back through both the wide part 1310 and deep part 1320 as described above. The end result is a model that can accurately predict results from general rules while able to account for specific exceptions to those rules.

Figure 14:
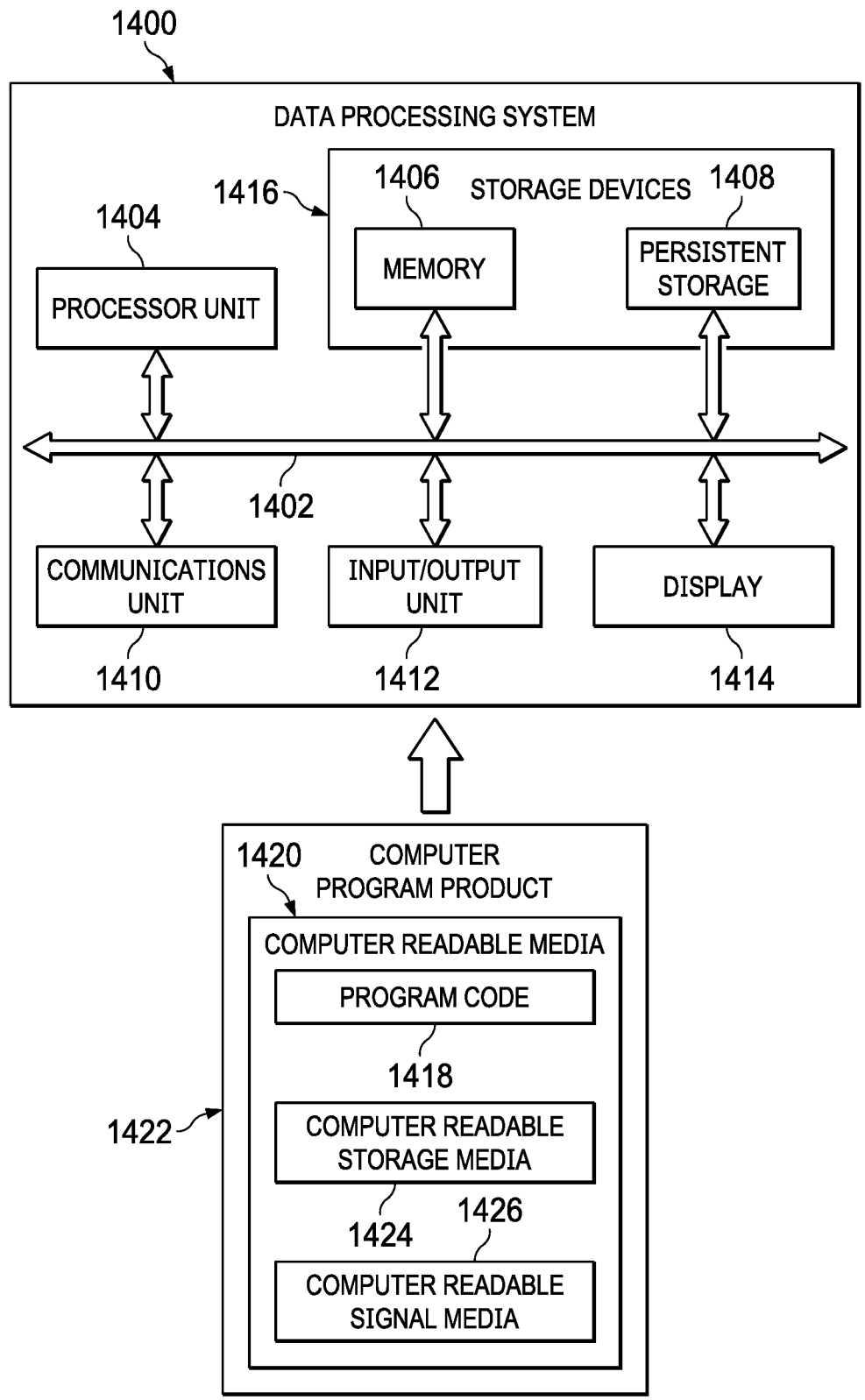
FIG. 14 is an illustration of a block diagram of a data processing system in accordance with an illustrative embodiment.

Turning now to FIG. 14, an illustration of a block diagram of a data processing system is depicted in accordance with an illustrative embodiment. Data processing system 1400 may be used to implement one or more computers in network computer system 130 in FIG. 1, such as, for example, client computer 112 or server computer 104. Data processing system 1400 may also be used to implement system 200 in FIG. 2. In this illustrative example, data processing system 1400 includes communications framework 1402, which provides communications between processor unit 1404, memory 1406, persistent storage 1408, communications unit 1410, input/output unit 1412, and display 1414. In this example, communications framework 1402 may take the form of a bus system.

Processor unit 1404 serves to execute instructions for software that may be loaded into memory 1406. Processor unit 1404 may be a number of processors, a multi-processor core, or some other type of processor, depending on the particular implementation. In an embodiment, processor unit 1404 comprises one or more conventional general purpose central processing units (CPUs). In an alternate embodiment, processor unit 1404 comprises one or more graphical processing units (CPUs).

Memory 1406 and persistent storage 1408 are examples of storage devices 1416. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1416 may also be referred to as computer-readable storage devices in these illustrative examples. Memory 1416, in these examples, may be, for example, a random access memory or any other suitable volatile or non-volatile storage device. Persistent storage 1408 may take various forms, depending on the particular implementation.

For example, persistent storage 1408 may contain one or more components or devices. For example, persistent storage 1408 may be a hard drive, a flash memory, a rewritable optical disk, a rewritable magnetic tape, or some combination of the above. The media used by persistent storage 1408 also may be removable. For example, a removable hard drive may be used for persistent storage 1408. Communications unit 1410, in these illustrative examples, provides for communications with other data processing systems or devices. In these illustrative examples, communications unit 1410 is a network interface card.

Input/output unit 1412 allows for input and output of data with other devices that may be connected to data processing system 1400. For example, input/output unit 1412 may provide a connection for user input through at least one of a keyboard, a mouse, or some other suitable input device. Further, input/output unit 1412 may send output to a printer. Display 1414 provides a mechanism to display information to a user.

Instructions for at least one of the operating system, applications, or programs may be located in storage devices 1416, which are in communication with processor unit 1404 through communications framework 1402. The processes of the different embodiments may be performed by processor unit 1404 using computer-implemented instructions, which may be located in a memory, such as memory 1406.

These instructions are referred to as program code, computer-usable program code, or computer-readable program code that may be read and executed by a processor in processor unit 1404. The program code in the different embodiments may be embodied on different physical or computer-readable storage media, such as memory 1406 or persistent storage 1408.

Program code 1418 is located in a functional form on computer-readable media 1420 that is selectively removable and may be loaded onto or transferred to data processing system 1400 for execution by processor unit 1404. Program code 1418 and computer-readable media 1420 form computer program product 1422 in these illustrative examples. In one example, computer-readable media 1420 may be computer-readable storage media 1424 or computer-readable signal media 1426.

In these illustrative examples, computer-readable storage media 1424 is a physical or tangible storage device used to store program code 1418 rather than a medium that propagates or transmits program code 1418. Alternatively, program code 1418 may be transferred to data processing system 1400 using computer-readable signal media 1426.

Computer-readable signal media 1426 may be, for example, a propagated data signal containing program code 1418. For example, computer-readable signal media 1426 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1400 are not meant to provide architectural limitations to the manner in which different embodiments may be implemented. The different illustrative embodiments may be implemented in a data processing system including components in addition to or in place of those illustrated for data processing system 1400. Other components shown in FIG. 14 can be varied from the illustrative examples shown. The different embodiments may be implemented using any hardware device or system capable of running program code 1418.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer implemented method for extracting named entity information from full text, comprising:
    obtaining text data from a document;
    tokenizing the text data as numbers to produce a tokenized layer;
    creating an embedded layer from the tokenized layer by encoding the text data by indices;
    creating a one-dimensional Xception layer from the embedded layer according to a one-dimensional convolution;
    determining a sequence of classification for the text data according to the one-dimensional Xception layer; and
    determining a named entity value from the text data according to the sequence of classification, wherein each sequence of classification predicts one character of the named entity value.

2. The method of claim 1, wherein determining the sequence of classification comprises determining a long short-term memory unit (LSTM) layer according to the one-dimensional Xception layer.

3. The method of claim 2, further comprising:
    determining a fully connected neural network with a dimension of a number of sequences multiplied by a dimension factor and a rectified linear unit (ReLU) activation function to change a model from linear to non-linear such that the model can fit a complex data model.

4. The method of claim 3, wherein a default value of the dimension factor is 64.

5. The method of claim 3, further comprising:
    reshaping the LSTM layer by a number of sequence and a sequence factor according using the fully connected neural network to form a reshaped LSTM layer.

6. The method of claim 5, further comprising:
    determining a second LSTM layer according to the reshaped LSTM layer, wherein the second LSTM layer comprises a default dimension and a dropout rate.

7. The method of claim 6, wherein the default dimension is 256 and the dropout rate is 0.5.

8. The method of claim 6, further comprising:
determining a second fully connected neural network from the second LSTM layer and according to a SoftMax activation function, wherein the second fully connected neural network comprises a dimension of a number of classes.

9. The method of claim 1, wherein determining the sequence of classification comprises determining a plain fully connected neural network according to the one-dimensional Xception layer, wherein each sequence has a same number of classes.

10. The method of claim 9, further comprising:
determining a number of sequence parallel to the plain fully connected neural network with the dimension as a number of classes according to the SoftMax activation function and the one-dimensional Xception layer.

11. The method of claim 10, further comprising:
concatenating the plain fully connected neural network to form a concatenated plain fully connected neural network; and
reshaping the concatenated plain fully connected neural network to a number of sequence and a number of classes.

12. The method of claim 1, wherein each sequence of classification has a different number of classes.

13. The method of claim 12, further comprising:
determining a number of sequences of parallel fully connected neural networks according to the one-dimensional Xception layer and a SoftMax activation function, wherein each of the number of sequences of parallel fully connected neural networks comprise a dimension that is a corresponding number of classes.

14. The method of claim 13, further comprising:
concatenating the parallel fully connected neural networks.

15. A computer for extracting named entity information from full text, comprising:
a processor; and
a non-transitory computer readable storage medium storing program code which, when executed by the processor, performs a computer-implemented method extracting named entity information from full text, the program code comprising instructions for:
obtaining text data from a document;
tokenizing the text data as numbers to produce a tokenized layer;
creating an embedded layer from the tokenized layer by encoding the text data by indices;
creating a one-dimensional Xception layer from the embedded layer according to a one-dimensional convolution;
determining a sequence of classification for the text data according to the one-dimensional Xception layer; and
determining a named entity value from the text data according to the sequence of classification, wherein each sequence of classification predicts one character of the named entity value.

16. The computer of claim 15, wherein the instructions for determining the sequence of classification comprises instructions for determining a long short-term memory unit (LSTM) layer according to the one-dimensional Xception layer.

17. The computer of claim 16, wherein the program code further comprises instructions for:
determining a fully connected neural network with a dimension of a number of sequences multiplied by a dimension factor and a rectified linear unit (ReLU) activation function to change a model from linear to non-linear such that the model can fit a complex data model.

18. The computer of claim 17, wherein a default value of the dimension factor is 64.

19. The computer of claim 17, wherein the program code further comprises instructions for:
reshaping the LSTM layer to a number of sequence and a sequence factor to form a reshaped LSTM layer.

20. The computer of claim 19, wherein the program code further comprises instructions for:
determining a second LSTM layer according to the reshaped LSTM layer, wherein the second LSTM layer comprises a default dimension and a dropout rate.

21. The computer of claim 20, wherein the default dimension is 256 and the dropout rate is 0.5.

22. The computer of claim 20, wherein the program code further comprises instructions for:
determining a second fully connected neural network from the second LSTM layer and according to a SoftMax activation function, wherein the second fully connected neural network comprises a dimension of a number of classes.

23. The computer of claim 15, wherein the instructions for determining the sequence of classification comprises instructions for determining a plain fully connected neural network according to the one-dimensional Xception layer, wherein each sequence has a same number of classes.

24. The computer of claim 23, wherein the program code further comprises instructions for:
determining a number of sequence parallel to the plain fully connected neural network with a dimension as a number of classes according to a SoftMax activation function and the one-dimensional Xception layer.

25. The computer of claim 24, wherein the program code further comprises instructions for:
concatenating the plain fully connected neural network to form a concatenated plain fully connected neural network; and
reshaping the concatenated plain fully connected neural network to a number of sequence and a number of classes.

26. The computer of claim 15, wherein each sequence of classification has a different number of classes.

27. The computer of claim 26, wherein the program code further comprises instructions for:
determining a number of sequences of parallel fully connected neural networks according to the one-dimensional Xception layer and a SoftMax activation function, wherein each of the number of sequences of parallel fully connected neural networks comprise a dimension that is a corresponding number of classes.

28. The computer of claim 27, wherein the program code further comprises instructions for:
concatenating the parallel fully connected neural networks.

29. A computer program product for extracting named entity information from full text, the computer program product comprising:
a non-transitory computer readable storage medium having program instructions embodied therewith, the program instructions executable by a number of processors to cause the computer to perform the steps of:
obtaining text data from a document;
tokenizing the text data as numbers to produce a tokenized layer;

creating an embedded layer from the tokenized layer by encoding the text data by indices;

creating a one-dimensional Xception layer from the embedded layer according to a one-dimensional convolution;

determining a sequence of classification for the text data according to the one-dimensional Xception layer; and determining a named entity value from the text data according to the sequence of classification, wherein each sequence of classification predicts one character of the named entity value.

30. The computer of claim 29, wherein a step for determining the sequence of classification comprises the step for determining a long short-term memory unit (LSTM) layer according to the one-dimensional Xception layer.

31. The computer of claim 30, wherein the program instructions are further executable by the number of processors to cause the computer to further perform the step of:

determining a fully connected neural network with a dimension of a number of sequences multiplied by a dimension factor and a rectified linear unit (ReLU) activation function to change a model from linear to non-linear such that the model can fit a complex data model.

32. The computer of claim 31, wherein a default value of the dimension factor is 64.

33. The computer of claim 31, wherein the program instructions are further executable by the number of processors to cause the computer to further perform the step of:

reshaping the LSTM layer to a number of sequence and a sequence factor to form a reshaped LSTM layer.

34. The computer of claim 33, wherein the program instructions are further executable by the number of processors to cause the computer to further perform the step of:

determining a second LSTM layer according to the reshaped LSTM layer, wherein the second LSTM layer comprises a default dimension and a dropout rate.

35. The computer of claim 34, wherein the default dimension is 256 and the dropout rate is 0.5.

36. The computer of claim 34, wherein the program instructions are further executable by the number of processors to cause the computer to further perform the step of:

determining a second fully connected neural network from the second LSTM layer and according to a SoftMax activation function, wherein the second fully connected neural network comprises a dimension of a number of classes.

37. The computer of claim 29, wherein the step for determining the sequence of classification comprises a step for determining a plain fully connected neural network according to the one-dimensional Xception layer, wherein each sequence has a same number of classes.

38. The computer of claim 37, wherein the program instructions are further executable by the number of processors to cause the computer to further perform the step of:

determining a number of sequence parallel to the plain fully connected neural network with a dimension as a number of classes according to a SoftMax activation function and the one-dimensional Xception layer.

39. The computer of claim 38, wherein the program instructions are further executable by the number of processors to cause the computer to further perform the steps of:

concatenating the plain fully connected neural network to form a concatenated plain fully connected neural network; and reshaping the concatenated plain fully connected neural network to a number of sequence and a number of classes.

40. The computer of claim 29, wherein each sequence of classification has a different number of classes.

41. The computer of claim 40, wherein the program instructions are further executable by the number of processors to cause the computer to further perform the step of:

determining a number of sequences of parallel fully connected neural networks according to the one-dimensional Xception layer and a SoftMax activation function, wherein each of the number of sequences of parallel fully connected neural networks comprise a dimension that is a corresponding number of classes.

42. The computer of claim 41, wherein the program instructions are further executable by the number of processors to cause the computer to further perform the step of:

concatenating the parallel fully connected neural networks.

* * * * *